United States Patent
Kim et al.

(10) Patent No.: US 10,789,754 B2
(45) Date of Patent: Sep. 29, 2020

(54) GENERATING TARGET-CHARACTER-ANIMATION SEQUENCES BASED ON STYLE-AWARE PUPPETS PATTERNED AFTER SOURCE-CHARACTER-ANIMATION SEQUENCES

(71) Applicants: Adobe Inc., San Jose, CA (US); Czech Technical University in Prague, Prague (CZ)

(72) Inventors: Vladimir Kim, Seattle, WA (US); Wilmot Li, San Francisco, CA (US); Marek Dvorožňák, Prague (CZ); Daniel Sýkora, Prague (CZ)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/047,839

(22) Filed: Jul. 27, 2018

(65) Prior Publication Data

US 2020/0035010 A1 Jan. 30, 2020

(51) Int. Cl.
*G06T 13/80* (2011.01)
*G06T 13/40* (2011.01)

(52) U.S. Cl.
CPC ............. *G06T 13/80* (2013.01); *G06T 13/40* (2013.01)

(58) Field of Classification Search
None
See application file for complete search history.

(56) References Cited

U.S. PATENT DOCUMENTS

| | | | | |
|---|---|---|---|---|
| 6,535,215 B1* | 3/2003 | DeWitt | ................... | G06T 13/40 345/473 |
| 2010/0321386 A1* | 12/2010 | Lin | ......................... | G06T 13/00 345/420 |
| 2012/0218262 A1* | 8/2012 | Yomdin | .................. | G06T 13/40 345/419 |
| 2014/0035929 A1* | 2/2014 | Matthews | ............... | G06T 13/40 345/473 |

OTHER PUBLICATIONS

Song et al.; "Sparse Rig Parameter Optimization for Character Animation;" EUROGRAPHICS May 23, 2017; pp. 85-94; Published by John Wiley & Sons Ltd (Year: 2017).*

(Continued)

*Primary Examiner* — Edward Martello
(74) *Attorney, Agent, or Firm* — Keller Jolley Preece

(57) ABSTRACT

This disclosure relates to methods, non-transitory computer readable media, and systems that use style-aware puppets patterned after a source-character-animation sequence to generate a target-character-animation sequence. In particular, the disclosed systems can generate style-aware puppets based on an animation character drawn or otherwise created (e.g., by an artist) for the source-character-animation sequence. The style-aware puppets can include, for instance, a character-deformational model, a skeletal-difference map, and a visual-texture representation of an animation character from a source-character-animation sequence. By using style-aware puppets, the disclosed systems can both preserve and transfer a detailed visual appearance and stylized motion of an animation character from a source-character-animation sequence to a target-character-animation sequence.

20 Claims, 12 Drawing Sheets

(56) References Cited

OTHER PUBLICATIONS

Guo et al.; "As-rigid-as-possible shape deformation and interpolation;" J. Vis. Commun. Image R. 19 (2008) pp. 245-255; Feb. 2008 (Year: 2008).*

Igarashi et al.; "As-Rigid-As-Possible Shape Manipulation;" pp. 1134-1141; ACM Transactions on Graphics; vol. 24, Issue 3, Jul. 2005 (Year: 2005).*

Rahul Arora, Ishan Darolia, Vinay P. Namboodiri, Karan Singh, and Adrien Bousseau. 2017. SketchSoup: Exploratory Ideation Using Design Sketches. Computer Graphics Forum 36, 8 (2017), 302-312.

Yunfei Bai, Danny M Kaufman, C. Karen Liu, and Jovan Popović. 2016. Artist-directed dynamics for 2D animation. ACM Transactions on Graphics 35, 4 (2016), 145.

William Baxter and Ken-ichi Anjyo. 2006. Latent Doodle Space. Computer Graphics Forum 25, 3 (2006), 477-485.

William Baxter, Pascal Barla, and Ken Anjyo. 2009. N-way morphing for 2D animation. Journal of Visualization and Computer Animation 20, 2-3 (2009), 79-87.

Pierre Bénard, Forrester Cole, Michael Kass, Igor Mordatch, James Hegarty, Martin Sebastian Senn, Kurt Fleischer, Davide Pesare, and Katherine Breeden. 2013. Stylizing animation by example. ACM Transactions on Graphics 32, 4 (2013), 119.

Mikhail Bessmeltsev, Nicholas Vining, and Alla Sheffer. 2016. Gesture3D: posing 3D characters via gesture drawings. ACM Transactions on Graphics 35, 6 (2016), 165.

Christoph Bregler, Lorie Loeb, Erika Chuang, and Hrishi Deshpande. 2002. Turning to the Masters: Motion Capturing Cartoons. ACM Transactions on Graphics 21, 3 (2002), 399-407.

Ian Buck, Adam Finkelstein, Charles Jacobs, Allison Klein, David Salesin, Joshua Seims, Richard Szeliski, and Kentaro Toyama. 2000. Performance-Driven Hand-Drawn Animation. In Proceedings of International Symposium on Non-Photorealistic Animation and Rendering. 101-108.

Nestor Burtnyk and Marceli Wein. 1976. Interactive Skeleton Techniques for Enhancing Motion Dynamics in Key Frame Animation. Commun. ACM 19, 10 (1976), 564-569.

Edwin E. Catmull. 1978. The Problems of Computer-Assisted Animation. 12, 3 (1978), 348-353.

James Davis, Maneesh Agrawala, Erika Chuang, Zoran Popovic, and David Salesin. 2003. A sketching interface for articulated figure animation. In Proceedings of the ACM SIGGRAPH/Eurographics Symposium on Computer Animation. 320-328.

Marek Dvorožňák, Pierre Benard, Pascal Barla, Oliver Wang, and Daniel Sýkora. 2017. Example-Based Expressive Animation of 2D Rigid Bodies. ACM Transactions on Graphics 36, 4, Article 127 (2017).

Elmar Eisemann and Frédo Durand. 2004. Flash photography enhancement via intrinsic relighting. ACM Transactions on Graphics 23, 3 (2004), 673-678.

Jakub Fišer, Ondřej Jamriška, Michal Lukáč, Eli Shechtman, Paul Asente, Jingwan Lu, and Daniel Sýkora. 2016. StyLit: Illumination-guided Example-based Stylization of 3D Renderings. ACM Transactions on Graphics 35, 4 (2016), 92.

Jakub Fišer, Ondřej Jamriška, David Simons, Eli Shechtman, Jingwan Lu, Paul Asente, Michal Lukáč, and Daniel Sýkora. 2017. Example-Based Synthesis of Stylized Facial Animations. ACM Transactions on Graphics 36, 4, Article 155 (2017).

Jakub Fišer, Michal Lukáč, Ondřej Jamriška, Martin Čaclik, Yotam Gingold, Paul Asente, and Daniel Sykora. 2014. Color Me Noisy: Example-Based Rendering of Hand- Colored Animations with Temporal Noise Control. Computer Graphics Forum 33, 4 (2014), 1-10.

Ben Glocker, Nikos Komodakis, Georgios Tziritas, Nassir Navab, and Nikos Paragios. 2008. Dense Image Registration Through MRFs and Efficient Linear Programming. Medical Image Analysis 12, 6 (2008), 731-741.

William van Haevre, Fabian di Fiore, and Frank van Reeth. 2005. Uniting Cartoon Textures with Computer Assisted Animation. In Proceedings of International Conference on Computer Graphics and Interactive Techniques in Australasia and South East Asia. 245-253.

Aaron Hertzmann, Charles E Jacobs, Nuria Oliver, Brian Curless, and David H Salesin. 2001. Image analogies. In Proceedings of the 28th annual conference on Computer graphics and interactive techniques. ACM, 327-340.

Alexander Hornung, Ellen Dekkers, and Leif Kobbelt. 2007. Character Animation from 2D Pictures and 3D Motion Data. ACM Transactions on Graphics 26, 1 (2007).

Eakta Jain, Yaser Sheikh, and Jessica K. Hodgins. 2009. Leveraging the talent of hand animators to create three-dimensional animation. In Proceedings of the ACM SIGGRAPH/Eurographics Symposium on Computer Animation. 93-102.

Ben Jones, Jovan Popovic, James McCann, Wilmot Li, and Adam W. Bargteil. 2015. Dynamic sprites: Artistic authoring of interactive animations. Journal of Visualization and Computer Animation 26, 2 (2015), 97-108.

Christina de Juan and Bobby Bodenheimer. 2004. Cartoon Textures. In Proceedings of Eurographics Symposium on Computer Animation. 267-276.

Christina N. de Juan and Bobby Bodenheimer. 2006. Re-using traditional animation: Methods for semi-automatic segmentation and inbetweening. In Proceedings of the ACM SIGGRAPH/Eurographics Symposium on Computer Animation. 223-232.

Rubaiat Habib Kazi, Tovi Grossman, Nobuyuki Umetani, and George Fitzmaurice. 2016. Motion Amplifiers: Sketching Dynamic Illustrations Using the Principles of 2D Animation. In Proceedings of ACM Conference on Human Factors in Computing Systems. 4599-4609.

Alexander Kort. 2002. Computer Aided Inbetweening. In Proceedings of International Symposium on Non-Photorealistic Animation and Rendering. 125-132.

Lucas Kovar, Michael Gleicher, and Frédéric Pighin. 2002. Motion Graphs. ACM Transactions on Graphics 21, 3 (2002), 473-482.

Vivek Kwatra, Irfan A. Essa, Aaron F. Bobick, and Nipun Kwatra. 2005. Texture optimization for example-based synthesis. ACM Transactions on Graphics 24, 3 (2005), 795-802.

John Lasseter. 1987. Principles of Traditional Animation Applied to 3D Computer Animation. In Proceedings of the 14th Annual Conference on Computer Graphics and Interactive Techniques. 35-44.

Seungyong Lee, George Wolberg, and Sung Yong Shin. 1998. Polymorph: Morphing Among Multiple Images. IEEE Computer Graphics and Applications 18, 1 (1998), 58-71.

Sun-Young Lee, Jong-Chul Yoon, Ji-Yong Kwon, and In-Kwon Lee. 2012. CartoonModes: Cartoon Stylization of Video Objects Through Modal Analysis. Graphical Models 74, 2 (2012), 51-60.

Dushyant Mehta, Srinath Sridhar, Oleksandr Sotnychenko, Helge Rhodin, Mohammad Shafiei, Hans-Peter Seidel, Weipeng Xu, Dan Casas, and Christian Theobalt. 2017. VNect: Real-time 3D Human Pose Estimation with a Single RGB Camera. ACM Transactions on Graphics 36, 4 (2017), 44:1-44:14.

Johannes Schmid, Robert W. Sumner, Huw Bowles, and Markus Gross. 2010. Programmable Motion Effects. ACM Transactions on Graphics 29, 4 (2010), 57.

Daniel Sýkora, Mirela Ben-Chen, Martin Čadik, Brian Whited, and Maryann Simmons. 2011. TexToons: Practical Texture Mapping for Hand-drawn Cartoon Animations. In Proceedings of International Symposium on Non-Photorealistic Animation and Rendering. 75-83.

Daniel Sýkora, Jan Burianek, and Jiří Žára. 2005. Sketching Cartoons by Example. In Proceedings of Eurographics Workshop on Sketch-Based Interfaces and Modeling. 27-34.

Daniel Sýkorakora, John Dingliana, and Steven Collins. 2009. As-Rigid-As-Possible Image Registration for Hand-Drawn Cartoon Animations. In Proceedings of International Symposium on Non-Photorealistic Animation and Rendering. 25-33.

Daniel Sýkorakora, Ladislav Kavan, Martin Čadik, Ondřej Jamriška, Alec Jacobson, Brian Whited, Maryann Simmons, and Olga Sorkine-Hornung. 2014. Ink-and-Ray: Bas-Relief Meshes for Adding Global Illumination Effects to Hand-Drawn Characters. ACM Transactions on Graphics 33, 2 (2014), 16.

(56) References Cited

OTHER PUBLICATIONS

Daniel Sýkora, David Sedlacek, Sun Jinchao, John Dingliana, and Steven Collins. 2010. Adding Depth to Cartoons Using Sparse Depth (In)equalities. Computer Graphics Forum 29, 2 (2010), 615-623.

Cedric Vanaken, Chris Hermans, Tom Mertens, Fabian Di Fiore, Philippe Bekaert, and Frank Van Reeth. 2008. Strike a Pose: Image-Based Pose Synthesis. In Proceedings of the Conference on Vision, Modeling and Visualization. 131-138.

Jue Wang, Steven M. Drucker, Maneesh Agrawala, and Michael F. Cohen. 2006. The Cartoon Animation Filter. ACM Transactions on Graphics 25, 3 (2006), 1169-1173.

Xun Wang, Wenwu Yang, Haoyu Peng, and Guozheng Wang. 2013. Shape-aware skeletal deformation for 2D characters. The Visual Computer 29, 6-8 (2013), 545-553.

Yonatan Wexler, Eli Shechtman, and Michal Irani. 2007. Space-Time Completion of Video. IEEE Transactions on Pattern Analysis and Machine Intelligence 29, 3 (2007), 463-476.

Brian Whited, Gioacchino Noris, Maryann Simmons, Robert W. Sumner, Markus H. Gross, and Jarek Rossignac. 2010. BetweenIT: An Interactive Tool for Tight in betweening. Computer Graphics Forum 29, 2 (2010), 605-614.

Nora S. Willett, Wilmot Li, Jovan Popovic, Floraine Berthouzoz, and Adam Finkelstein. 2017. Secondary Motion for Performed 2D Animation. In Proceedings of the 30th Annual ACM Symposium on User Interface Software and Technology (UIST '17). ACM, New York, NY, USA, 97-108.

Wenwu Yang. 2017. Context-Aware Computer Aided Inbetweening. IEEE Transactions on Visualization and Computer Graphics (2017).

Chih-Kuo Yeh, Shi-Yang Huang, Pradeep Kumar Jayaraman, Chi-Wing Fu, and Tong-Yee Lee. 2017. Interactive High-Relief Reconstruction for Organic and Double-Sided Objects from a Photo. IEEE Transactions on Visualization and Computer Graphics 23, 7 (2017), 1796-1808.

Lei Zhang, Hua Huang, and Hongbo Fu. 2012. EXCOL: An EXtract-and-COmplete Layering Approach to Cartoon Animation Reusing. IEEE Transactions on Visualization and Computer Graphics 18, 7 (2012), 1156-1169.

Yufeng Zhu, Jovan Popović, Robert Bridson, and Danny M. Kaufman. 2017. Planar Interpolation with Extreme Deformation, Topology Change and Dynamics. ACM Transactions on Graphics 36, 6 (2017), 213.

* cited by examiner

GENERATING TARGET-CHARACTER-ANIMATION SEQUENCES BASED ON STYLE-AWARE PUPPETS PATTERNED AFTER SOURCE-CHARACTER-ANIMATION SEQUENCES

BACKGROUND

Computer animators increasingly use computer-animation systems to generate a sequence of two-dimensional characters for animated digital videos, video games, and other computer-animated imagery. In some cases, computer-animation systems create singular drawings for an animation within a frame of a sequence. In such single-drawing-based animations, the drawings may include a layer for a humanoid character and a layer for background that an artist hand draws or creates with computerized tools. To exploit these drawings, some existing computer-animation systems either reuse or adjust a single layer representing the animation character from one frame to another to automatically create an animation sequence.

Despite making advances in computerized-animation sequences, conventional computer-animation systems have a number of technical shortcomings that limit the accuracy and efficiency with which such systems replicate motion and artistic style of a hand-drawn character in a computerized animation sequence. For example, in single-drawing-based animations, some conventional computer-animation systems compress or stretch a visual texture of an animation character from frame to frame to create an inconsistent or contorted version of an animation character within the animation sequence. To avoid such textural inconsistencies or contortions, some conventional computer-animation systems impose rigid limits on an animation character's visual texture such that the texture or color of the character remains fixed throughout an animation sequence. This rigid limit on visual texture creates an unnatural and un-animated look to an animation sequence.

In addition to inconsistent or rigid textures, some computer-animation systems that use a single-drawing-based approach place limitations on motions an animation character may perform. For instance, some conventional computer-animation systems provide a limited set of transformations for a layer consisting of an animation character. By limiting transformations, such conventional systems cannot generate bulging of moving segments in an animation character (e.g., a bulging bicep in a moving arm), exaggerated bending of an animation character (e.g., exaggerated bending of a character's legs), or secondary effects (e.g., squashing and stretching of an animation character's legs in a jumping motion). The resulting animation sequences can appear with flatly shaded styles, exhibit stiff or jerky motion, or fail to portray new, desired motions for an animation character.

SUMMARY

This disclosure describes one or more embodiments of methods, non-transitory computer readable media, and systems that solve the foregoing problems in addition to providing other benefits. For example, in some embodiments, the disclosed systems use style-aware puppets patterned after a source-character-animation sequence to generate a target-character-animation sequence. In particular, the disclosed systems can generate style-aware puppets based on an animation character drawn or otherwise created (e.g., by an artist) for the source-character-animation sequence. The style-aware puppets can include, for instance, a character-deformational model, a skeletal-difference map, and a visual-texture representation of an animation character from a source-character-animation sequence. By using style-aware puppets, the disclosed systems can both preserve and transfer a detailed visual appearance and stylized motion of an animation character from a source-character-animation sequence to a target-character-animation sequence.

For instance, in some embodiments, the disclosed systems identify a source-character-animation sequence of an animation character portrayed in source drawings. The disclosed systems can also identify source-skeletal poses of a source skeleton corresponding to the source-character-animation sequence. In one or more embodiments, the disclosed systems subsequently generate style-aware puppets for the source drawings, where each style-aware puppet comprises a character-deformation model, a skeletal-difference map, and a visual-texture representation of a source drawing.

Having generated style-aware puppets, the disclosed systems further identify target-skeletal poses of a target skeleton as a new target motion for the animation character. The disclosed systems can then generate a target-character-animation sequence that reflects the new target motion of the target-skeletal poses. Specifically, for a target-skeletal pose, the disclosed systems select (from the source-character-animation sequence) a set of source drawings analogous to the target-skeletal pose. The disclosed systems subsequently blend style-aware puppets corresponding to the set of source drawings to create a target-style-aware puppet corresponding to the target-skeletal pose. Based on the target-style-aware puppet, the systems further generate a target-character-animation sequence of the animation character portrayed in target drawings.

BRIEF DESCRIPTION OF THE DRAWINGS

The detailed description refers to the drawings briefly described below.

DETAILED DESCRIPTION

Figure 1:
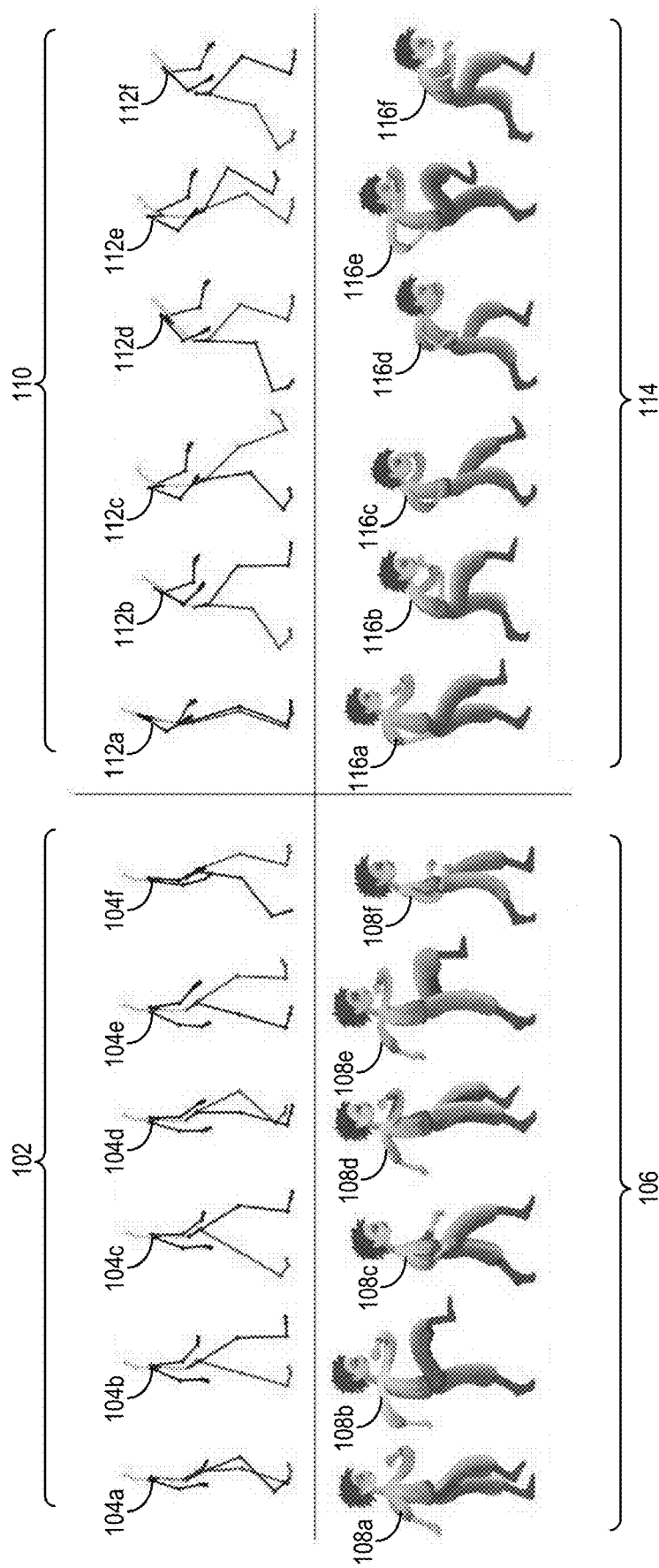
FIG. 1 illustrates a stylized-puppet-animation system using style-aware puppets patterned after a source-character-animation sequence to generate a target-character-animation sequence in accordance with one or more embodiments.

One or more embodiments described herein include a stylized-puppet-animation system that uses style-aware puppets patterned after an animation character from a source-character-animation sequence to generate the animation character in a new target-character-animation sequence. To generate such style-aware puppets, the stylized-puppet-animation system can create a layered-template puppet of the animation character and a character-deformational model, a skeletal-difference map, and a visual-texture representation of the animation character for each source drawing of a source-character-animation sequence. For a new target-character-animation sequence, the stylized-puppet-animation system blends style-aware puppets corresponding to analogous source drawings to generate a target-style-aware puppet for each frame of the target-character-animation sequence. By generating and blending style-aware puppets, the stylized-puppet-animation system preserves a detailed visual appearance and stylized motion of an animation character from a source-character-animation sequence. The disclosed system then further transfers that distinctive appearance and stylized motion to the new target-character-animation sequence—without further drawing or modification of the animation character from the artist.

For instance, in some embodiments, the stylized-puppet-animation system identifies a source-character-animation sequence of an animation character portrayed in source drawings. Moreover, the stylized-puppet-animation system can identify a source-skeletal-animation sequence of a source skeleton in source-skeletal poses that corresponds to the source-character-animation sequence. In one or more embodiments, the stylized-puppet-animation system subsequently generates style-aware puppets for the source drawings, where each style-aware puppet comprises a character-deformation model, a skeletal-difference map, and a visual-texture representation of a source drawing from the source drawings.

Having generated style-aware puppets, the stylized-puppet-animation system can further generate a target-character-animation sequence based on the style-aware puppets. For instance, in one or more embodiments, the stylized-puppet-animation system identifies a target-skeletal-animation sequence comprising a target skeleton in target-skeletal poses. For a target-skeletal pose, the stylized-puppet-animation system compares the target-skeletal pose with the source-skeletal-animation sequence to select a set of source-skeletal poses. The stylized-puppet-animation system further selects (from within the source-character-animation sequence) a set of source drawings analogous to the set of source-skeletal poses. The stylized-puppet-animation system subsequently blends style-aware puppets corresponding to the set of source drawings to create a target-style-aware puppet that corresponds to the target-skeletal pose. Based on the target-style-aware puppet (and other generated target-style-aware puppets), the stylized-puppet-animation system generates a target-character-animation sequence of the animation character portrayed in target drawings.

As just mentioned, in one or more embodiments, the stylized-puppet-animation system generates style-aware puppets for source drawings. To generate these style-aware puppets, in some embodiments, the stylized-puppet-animation system creates a layered-template puppet. The layered-template puppet can provide a reference for a character-deformation model, skeletal-difference map, and visual-texture representation of a source drawing. To create such a template puppet, in some cases, the stylized-puppet-animation system receives or identifies a model-source drawing of an animation character. The stylized-puppet-animation system creates semantic layers corresponding to segments of the animation character in the model-source drawing and assigns joints of a source skeleton to corresponding locations of the semantic layers.

As noted above, in addition to a layered-template puppet, in certain implementations, the stylized-puppet-animation system generates style-aware puppets that each comprise a character-deformation model, a skeletal-difference map, and a visual-texture representation of a source drawing. In some cases, the character-deformation model includes both a coarse-deformation model of the source drawing and a residual-deformation model of the source drawing. Together, the character-deformation model and the residual-deformation model reflect global and subtle changes of a source drawing with respect to the layered-template puppet. Moreover, the skeletal-difference map reflects differences between a source-skeletal pose and a stylized-skeletal pose corresponding to the source drawing.

As further noted above, the stylized-puppet-animation system can blend style-aware puppets corresponding to a set of source drawings to create a target-style-aware puppet that corresponds to a target-skeletal pose. As part of this blending, in some embodiments, the stylized-puppet-animation system identifies multiple sets of source drawings from the source-character-animation sequence for a target-skeletal pose. For instance, the stylized-puppet-animation system may select a first set of source drawings analogous to a target-skeletal pose and a second set of source drawings that overlap the first set of source drawings in the source-character-animation sequence. The stylized-puppet-animation system subsequently blends the style-aware puppets corresponding to the first and second sets of source drawings to generate a target-style-aware puppet.

By blending style-aware puppets, the stylized-puppet-animation system can create a target-style-aware puppet for a target drawing. For example, in some embodiments, blending multiple style-aware puppets creates a target-style-aware puppet comprising a modified-coarse-deformation model, a modified-residual-deformation model, a modified-skeletal-difference map, and a modified-visual-texture representation. By blending style-aware puppets corresponding to different (overlapping) sets of source drawings, in some embodiments, the stylized-puppet-animation system generates a target-style-aware puppet for each corresponding target drawing in a target-character-animation sequence.

Having generated a target-style-aware puppet, in certain implementations, the stylized-puppet-animation system uses the target-style-aware puppet to generate a target drawing. In particular, the stylized-puppet-animation system can utilize a modified-coarse-deformation model, modified-residual-deformation model, and modified-skeletal-difference map from a target-style-aware puppet to generate a target drawing from a target-skeletal pose. The stylized-puppet-animation system can also utilize a modified-visual-texture-representation to generate a target drawing, such as a target drawing that reflects an accurate style and texture for the target-skeletal pose.

In one or more embodiments, the stylized-puppet-animation system renders texture from a modified-visual-texture-representation to a layered-template puppet utilizing one or both of a segmentation-guidance channel and a temporal-appearance-guidance channel. As part of generating a target drawing, for instance, the stylized-puppet-animation system can use a segmentation-guidance channel to accurately apply texture (e.g., color, strokes) to appropriate regions of the layered-template puppet in a stylized pose. Moreover, the stylized-puppet-animation system can utilize the temporal-appearance-guidance channel to reduce flicker and other artifacts across frames of the target-character-animation sequence. Accordingly, the stylized-puppet-animation system can utilize these guidance channels to render a smoothed version of the modified-visual-texture representation on a layered-template puppet. Using this approach, the stylized-puppet-animation system can generate target drawings for a complete target-character-animation sequence.

The disclosed stylized-puppet-animation system overcomes several technical deficiencies that hinder conventional computer-animation systems. First, the stylized-puppet-animation system improves the accuracy with which a computer-animation system preserves and transfers the visual appearance and stylized motion of a two-dimensional animation character drawn or otherwise created in a source-character-animation sequence. While some conventional computer-animation systems compress, stretch, or otherwise distort a visual texture of an animation character when repurposing an animation character into a new target motion, the stylized-puppet-animation system uses a visual-texture representation of a style-aware puppet to ensure the visual texture of an artist's animation character transfers over to a target-character-animation sequence. Whereas some conventional computer-animation systems create artificial-looking or rigid-looking motion in new target motions, the stylized-puppet-animation system uses a character-deformation model and skeletal-difference map to preserve the stylized motion of an animation character's segments in the new target-character-animation sequence. Indeed, unlike previous systems, the stylized-puppet-animation system preserves the visual appearance and stylized motion of an animation character's individual segments by utilizing style-aware puppets to generate accurate target-character-animation sequences.

Second, the stylized-puppet-animation system increases the flexibility with which a computer-animation system renders motion in a new animation sequence for a two-dimensional animation character. While certain conventional computer-animation systems rigidly limit the transformations available for an animation character, the stylized-puppet-animation system can generate target-character-animation sequences that expand the range of motion for an animation character in a new target-character-animation sequence. Unlike previous computer-animation systems, the stylized-puppet-animation system captures the bulging of moving segments, exaggerated bending, and secondary effects of an animation character in new target motions. In addition to an expanded range of motions, in some embodiments, the stylized-puppet-animation system can use style-aware puppets to generate different target-character-animation sequences from a single source-character-animation sequence. For instance, the stylized-puppet-animation system can transfer the stylistic motion of an animation character's head, arms, and legs from an animation sequence for one type of animated walk or other motion to new sequences exhibiting a variety of walks or other motions by the same animation character.

Third, in some embodiments, by using style-aware puppets, the stylized-puppet-animation system generates target-character-animation sequences that replicate an artist's style with an accuracy that previously could only be replicated by human animators through a tedious, inefficient process. Rather than a human animator drawing (or creating with computerized tools) a two-dimensional animation character, in certain embodiments, the stylized-puppet-animation system employs a unique algorithm that automates an animation process slowed by human animators. For instance, the stylized-puppet-animation system can generate and identify style-aware puppets corresponding to target-skeletal poses, blend such style-aware puppets to create target-style-aware puppets for a new target-character-animation sequence, and smooth visual texture with guidance channels to replicate the animation character in target drawings of the target-character-animation sequence. By using an algorithm that reduces an artist's input, the stylized-puppet-animation system improves efficiency of implementing computer-animation systems relative to prior conventional systems that require significant artistic input to create a new animation sequence for an animation character.

Fourth, in some embodiments, the stylized-puppet-animation system uses unique guidance channels to improve the consistency and quality with which a computer-animation system renders a new animation sequence for an animation character. By combining a joint-bilateral filter to smooth visual texture, for instance, the stylized-puppet-animation system creates a temporal-appearance-guidance channel that avoids the blurring of visual textures across segments of a target drawing—as some existing computer-animation systems do. Indeed, the stylized-puppet-animation system decreases the amount of temporal flickering between frames of a target-character-animation sequence. By reducing temporal flicker, the stylized-puppet-animation system reduces the fluctuation of texture for segments of the animation character between frames, making for a smoother rendering of an animation character in a new target motion.

Turning now to FIG. 1, this figure depicts a stylized-puppet-animation system using style-aware puppets patterned after a source-character-animation sequence 106 to generate a target-character-animation sequence 114 in accordance with one or more embodiments. As shown in FIG. 1, an artist or other user draws or otherwise creates an animation character in the source-character-animation sequence 106 corresponding to a source-skeletal-animation sequence 102. The stylized-puppet-animation system subsequently generates style-aware puppets corresponding to the source-character-animation sequence 106 and identifies a target-skeletal-animation sequence 110 as a new target motion for the animation character. The stylized-puppet-animation system subsequently uses the style-aware puppets to generate the animation character portrayed in the target-character-animation sequence 114.

When generating the target-character-animation sequence 114, the stylized-puppet-animation system analyzes the differences between the source-skeletal-animation sequence 102 and the source-character-animation sequence 106 to generate the target-character-animation sequence 114 from the target-skeletal-animation sequence 110. In other words, just as the source-character-animation sequence 106 is based on the source-skeletal-animation sequence 102, so is the target-character-animation sequence 114 based on the target-skeletal-animation sequence 110. Accordingly, the stylized-puppet-animation system transfers the visual appearance and stylized motion of the source-character-animation sequence 106 to the target-skeletal-animation sequence 110 to form the target-character-animation sequence 114.

As indicated by FIG. 1, an artist draws or otherwise creates the source-character-animation sequence 106 corresponding to the source-skeletal-animation sequence 102. In some embodiments, for instance, the artist hand colors or hand draws a two-dimensional animation character in a series of source drawings 108a-108f patterned after source-skeletal poses 104a-104f from the source-skeletal-animation sequence 102. Additionally, or alternatively, the artist uses computerized tools to digitally draw or otherwise model the two-dimensional animation character portrayed in the source drawings 108a-108f. Regardless of how the artist creates the source drawings 108a-108f, the source-character-animation sequence 106 follows the motion of the source-skeletal-animation sequence 102. Together, the source-skeletal-animation sequence 102 and the source-character-animation sequence 106 form a source exemplar for generating a target-character-animation sequence.

As used in this disclosure, the term "animation character" refers to an object drawn or otherwise created by an artist for a source-character-animation sequence. The object may be any articulated object including, but not limited to, animated animals, furniture, humanoids, instruments, plants, machines, toys, or vehicles. In some embodiments, an "animation character" refers to a humanoid illustration initially drawn or otherwise created by an artist. As suggested above, in certain implementations, an animation character may be portrayed in either (i) a source-character-animation sequence as initially drawn or otherwise created by an artist or (ii) in a target-character-animation sequence as generated by the stylized-puppet-animation system. As shown in FIG. 1, for example, the source-character-animation sequence 106 includes a humanoid illustration as an animation character portrayed in the source drawings 108a-108f and the target-character-animation sequence 106 includes the humanoid illustration as the animation character portrayed in the target drawings 116a-116f.

The term "drawing" refers to an individual illustration of an animation character. In particular, the term drawing includes an illustration of an animation character drawn by an artist or generated by the stylized-puppet-animation system. Consistent with the disclosure above, an artist may hand draw an individual illustration or digitally draw the individual illustration with computerized tools. Similarly, a computer system can capture or generate an individual illustration. In some embodiments, the term "drawing" refers to an individual illustration of an animation character within a single frame of a character-animation sequence.

As further used in this disclosure, the term "source drawing" refers to a drawing that is part (or within a frame) of a source-character-animation sequence. As shown in FIG. 1, for instance, the source-character-animation sequence 106 includes the source drawings 108a-108f. A source drawing may include an illustration of any object, such as a vehicle with the vehicle's doors, tires, and other parts arranged in various positions. As another example, a source drawing may include an illustrated humanoid with the humanoid's arms, clothing, limbs, and other accessories or body parts arranged in various positions.

In some embodiments, each segment of a source drawing includes a visual texture. Such visual texture may include color, patterns, shading, stroke marks, or other distinctive stylistic marks for an animation character in a source drawing. As shown in FIG. 1, for instance, the source-character-animation sequence 106 includes a different visual texture for segments of the animation character portrayed in each of the source drawings 108a-108f. Each segment of the animation character includes different visual textures in each of the source drawings 108a-108f.

As used in this disclosure, the term "source-character-animation sequence" refers to a series of source drawings for an animation character (e.g., drawn or otherwise created by an artist or system). In certain implementations, the term "source-character-animation sequence" refers to an animated character portrayed in a series of source drawings resembling an animated motion. For example, a source-character-animation sequence may include an illustrated humanoid portrayed in source drawings that collectively exhibit a fighting, jumping, running, sitting, throwing, speaking, or walking motion.

As depicted in FIG. 1, for instance, the source-character-animation sequence 106 includes an illustrated humanoid portrayed in the source drawings 108a-108f that collectively exhibit a walking motion. Although not shown in FIG. 1, the stylized-puppet-animation system may identify and analyze other types of animation characters and other animated motions portrayed in source drawings. For example, a source-character-animation sequence may include an illustrated vehicle portrayed in source drawings that collectively exhibit an idling, crashing, jumping, racing, or skidding motion or an illustrated animal portrayed in source drawings that collectively exhibit a barking, digging, running, or squatting motion.

As noted above, the stylized-puppet-animation system receives (e.g., from an artist or computing device) the source-character-animation sequence 106 patterned after the source-skeletal-animation sequence 102. As used in this disclosure, the term "skeletal-animation sequence" refers to a series of positions of a skeleton that together form a motion. In particular, in some embodiments, the term "skeletal-animation sequence" refers to a series of skeletal poses comprising a skeleton's joints and segments, where the series of skeletal poses collectively resemble a motion. For example, a skeletal-animation sequence can include a plurality of frames (e.g., still frames) portraying a skeleton in a plurality of skeletal poses at a plurality of times. This disclosure uses the term "source-skeletal-animation sequence" to refer to a skeletal-animation sequence of a source skeleton.

Relatedly, the term "skeleton" refers to a digital or virtual armature or rig. For example, in some embodiments, the term "skeleton" refers to a collection of virtual segments connected by joints that together form a virtual armature or rig. In some such embodiments, a skeleton comprises a series of joints and joint chains with hierarchal relationships, such as parent joints that affect the placement of child joints.

As further used in this disclosure, the term "source skeleton" refers to a skeleton posed in a source-skeletalanimation sequence. As the term "skeleton" implies, the bones and joints of a humanoid skeleton resemble the bones and joints of a human. While FIG. 1 depicts a source skeleton as a humanoid, the stylized-puppet-animation system may use skeletons of any type of articulated object, such as, but not limited to, animated animals, furniture, humanoids, instruments, plants, machines, toys, or vehicles.

As noted above and as demonstrated by FIG. 1, a skeleton may be configured in a skeletal pose. The term "skeletal pose" refers to a position of a skeleton's segments and joints (e.g., at a particular frame or time). In particular, in some embodiments, the term "skeletal pose" refers to positions, velocities, and rotations for joints of a skeleton at a particular frame or time within a skeletal-animation sequence. As shown in FIG. 1, for instance, the source-skeletal-animation sequence 102 includes a source skeleton in source-skeletal poses 104a-104f. This disclosure uses the term "source-skeletal pose" to refer to a skeletal pose within a source-skeletal-animation sequence.

As shown in FIG. 1, because the source-skeletal-animation sequence 102 provides a reference for the source-character-animation sequence 106, the source-skeletal poses 104a-104f correspond to the source drawings 108a-108f, respectively. Accordingly, the source-skeletal pose 104a corresponds to the source drawing 108a drawn by the artist, the source-skeletal pose 104b corresponds to the source drawing 108b by the artist, and so on and so forth for the source-skeletal poses 104c-104f and the source drawings 108c-108f, respectively.

As further suggested by FIG. 1, after identifying or receiving the source-character-animation sequence 106, the stylized-puppet-animation system generates style-aware puppets for the source drawings 108a-108f. As used in this disclosure, the term "style-aware puppet" refers to a representation of a source drawing that encodes visual characteristics and position (e.g., positional changes relative to a template puppet) of an animation character in a source drawing. In particular, in some embodiments, the term "style-aware puppet" refers to a representation of a source drawing that includes a character-deformation model, a skeletal-difference map, and a visual-texture representation for a particular source drawing with respect to a layered-template puppet. This disclosure describes layered-template puppets, character-deformation models, skeletal-difference maps, and visual-texture representations further below with reference to FIGS. 2A and 2B.

As further shown in FIG. 1, the stylized-puppet-animation system identifies the target-skeletal-animation sequence 110 comprising a target skeleton in target-skeletal poses 112a-112f. The target-skeletal poses collectively resemble a new target motion for the animation character. The term "target-skeletal-animation sequence" refers to a skeletal sequence of a target skeleton representing a new target motion for an animation character. In some such embodiments, the stylized-puppet-animation system receives an indication from a client device to use a particular target-skeletal-animation sequence as a basis for a target-character-animation sequence. As mentioned above, the target-skeletal poses 112a-112f serve as a skeletal framework for the stylized-puppet-animation system to transfer the visual appearance and stylized motion of the source-character-animation sequence 106.

This disclosure uses particularized terms to describe a skeleton in a target-skeletal-animation sequence. For example, as used herein, the term "target skeleton" refers to a skeleton posed in a target-skeletal-animation sequence. Similarly, the term "target-skeletal pose" refers to a skeletal pose within a target-skeletal-animation sequence. In some embodiments, a target skeleton has the same joints and same bone (or segment) lengths as a source skeleton. Accordingly, in some cases, the source skeleton and the target skeleton are identical.

As suggested by FIG. 1, after identifying the target-skeletal-animation sequence 110, the stylized-puppet-animation system identifies a target-skeletal pose from among the target-skeletal-animation sequence 110. The stylized-puppet-animation system subsequently compares the target-skeletal pose with the source-skeletal-animation sequence 102 to select a set of source-skeletal poses from within the source-skeletal-animation sequence 102.

Having selected the set of source-skeletal poses, the stylized-puppet-animation system identifies a set of source drawings analogous to the set of source-skeletal poses. For example, as shown in FIG. 1, the stylized-puppet-animation system may identify source-skeletal poses 104a-104c as a set of source-skeletal poses and select the source drawings 108a-108c as analogous to the source-skeletal poses 104a-104c. As used here, the source drawings 108a-108c and the source-skeletal poses 104a-104c are merely examples of analogous sets from the source-character-animation sequence 106 and the source-skeletal-animation sequence 102.

Upon selecting the set of source drawings, the stylized-puppet-animation system blends style-aware puppets corresponding to the set of source drawings to create a target-style-aware puppet. As used in this disclosure, the term "target-style-aware puppet" refers to a style-aware puppet that represents a blended version of the visual characteristics and positions of multiple style-aware puppets. In particular, in some embodiments, the term "target-style-aware puppet" refers to a blend of character-deformation models, skeletal-difference maps, and visual-texture representations for style-aware puppets corresponding to a set of source drawings. As noted above, this disclosure describes character-deformation models, skeletal-difference maps, and visual-texture representations further below with reference to FIGS. 2A and 2B.

In certain embodiments, the stylized-puppet-animation system generates target-style-aware puppets for each frame of a target-character-animation sequence. For instance, in some cases, the stylized-puppet-animation system iteratively selects target-skeletal poses, blends style-aware puppets corresponding to sets of source drawings identified for each target-skeletal pose, and generates target-style-aware puppets corresponding to the selected target-skeletal poses.

Based on the target-style-aware puppets, the stylized-puppet-animation system generates the target-character-animation sequence 114. As shown in FIG. 1, the target-character-animation sequence 114 comprises the animation character portrayed in target drawings 116a-116f. As mentioned, the target-skeletal poses 112a-112f correspond to the target drawings 116a-116f, respectively. Accordingly, the target-skeletal pose 112a corresponds to the target drawing 116a, the target-skeletal pose 112b corresponds to the target drawing 116b, and so on and so forth for the target-skeletal poses 112c-112f and the target drawings 116c-116f, respectively.

As used in this disclosure, the term "target drawing" refers to a drawing digitally rendered or generated based on a source drawing. In particular, in some embodiments, the term "target drawing" refers a digitally rendered drawing that resembles a visual texture and deformation of one or more source drawings and is part (or within a frame of) a target-character-animation sequence. For example, a target drawing may include an illustrated humanoid with the humanoid's arms, clothing, limbs, and other accessories or body parts arranged in various positions that resemble the visual texture and deformation of one or more source drawings. As shown in FIG. 1, for instance, the target drawing 116a resembles the visual texture and deformation of at least the source drawing 108a.

Relatedly, the term "target-character-animation sequence" refers to a series of target drawings of an animation character. In particular, in certain implementations, the term "target-character-animation sequence" refers to an animated motion portrayed by a series of target drawings of an animation character. For example, a target-character-animation sequence may include an illustrated humanoid portrayed by target drawings that (i) collectively exhibit a fighting, jumping, running, sitting, throwing, speaking, or walking motion and (ii) resemble the visual appearance and stylized motion of a corresponding source-character-animation sequence.

As further depicted in FIG. 1, the target-character-animation sequence 114 includes an illustrated humanoid portrayed in the target drawings 116a-116f that collectively exhibit a modified walking motion. The target drawings 116a-116f resemble the visual appearance and stylized motion of the source drawings 108a-108f. Accordingly, the stylized-puppet-animation system transfers the visual appearance and stylized motion of the source-character-animation sequence 106 to the target-skeletal-animation sequence 110 based on a plurality of style-aware puppets to form the target-character-animation sequence 114.

Although not shown in FIG. 1, the stylized-puppet-animation system may generate a target-character-animation sequence for additional types of animation characters that portray other types of motions in target drawings. For example, a target-character-animation sequence may include an illustrated vehicle portrayed in target drawings that collectively exhibit an idling, crashing, jumping, racing, or skidding motion that resembles a source-character-animation sequence.

Figure 2A:
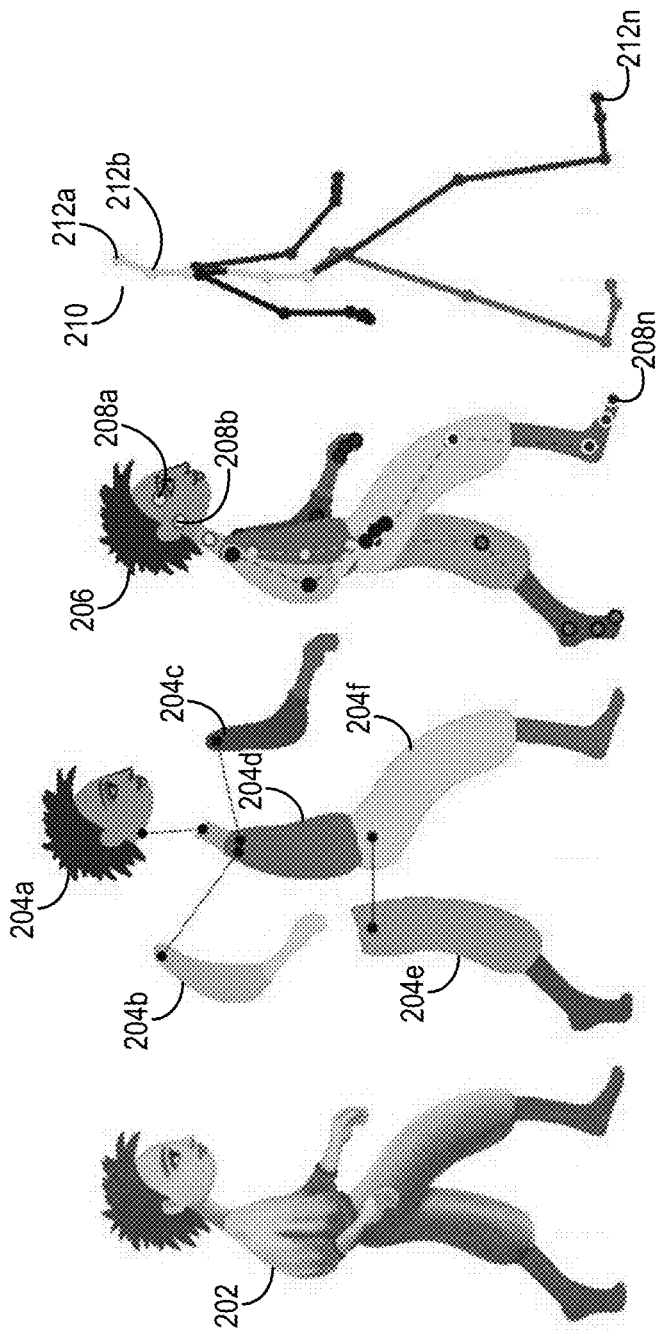
FIG. 2A illustrates the stylized-puppet-animation system creating a layered-template puppet in accordance with one or more embodiments.
Figure 2B:
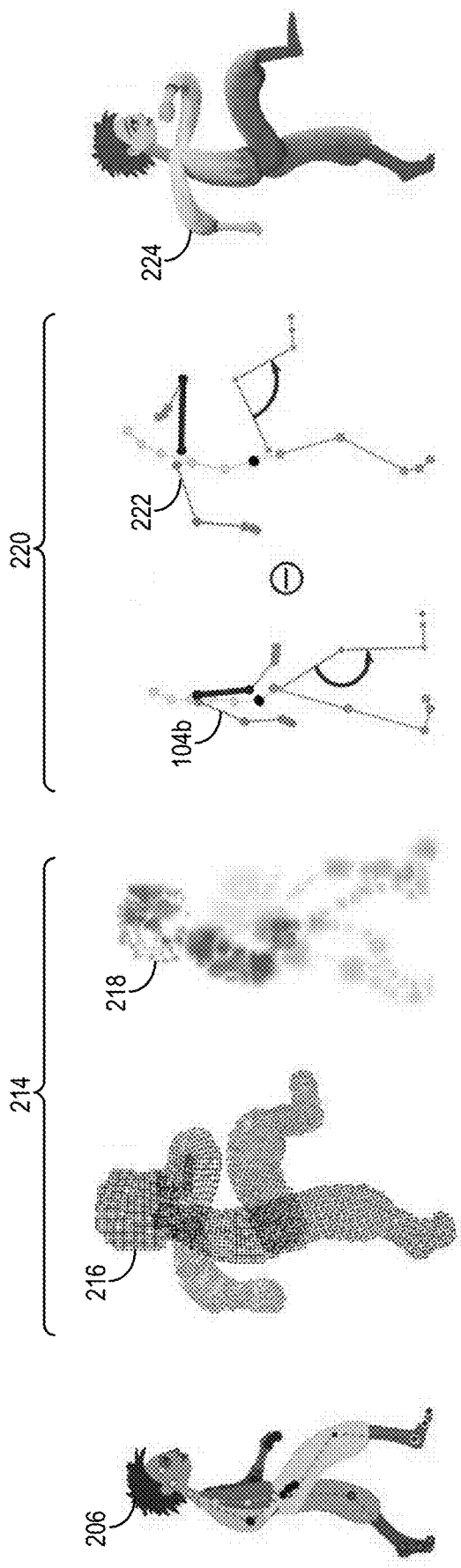
FIG. 2B illustrates the stylized-puppet-animation system generating a style-aware puppet for a source drawing of a source-character-animation sequence in accordance with one or more embodiments.

As noted above, in some embodiments, the stylized-puppet-animation system creates a layered-template puppet as a precursor to (or as part of) generating style-aware puppets. The layered-template puppet can serve as a reference for other parameters of a style-aware puppet. For example, FIG. 2A illustrates an example of a layered-template puppet 206 in accordance with one or more embodiments. Moreover, FIG. 2B illustrates an example of a style-aware puppet in accordance with one or more embodiments.

To create the layered-template puppet 206 shown in FIG. 2A, the stylized-puppet-animation system identifies a model-source drawing 202 of an animation character and creates semantic layers 204a-204f of the animation character in the model-source drawing 202. The stylized-puppet-animation system further identifies junctions at which each of the semantic layers 204a-204f connect to one or more of the semantic layers 204a-204f and assigns joints 212a-212n of a source skeleton 210 to corresponding locations 208a-208n of the layered-template puppet 206.

As used in this disclosure, the term "layered-template puppet" refers to an assembly of animation layers resembling a model-source drawing. In particular, in certain implementations, the term "layered-template puppet" refers to an assembly of animation layers resembling the visual texture and segments of a model-source drawing. As shown in FIG. 2, for instance, the layered-template puppet 206 is a humanoid assembly of semantic layers 204a-204f of the model-source drawing 202, where the semantic layers 204a-204f provide reference points for a visual texture and segments of the model-source drawing 202. As discussed further below, the stylized-puppet-animation system uses the layered-template puppet 206 as a reference for style-aware puppets.

As suggested by FIG. 2A, the stylized-puppet-animation system identifies or receives the model-source drawing 202 as a basis for creating the layered-template puppet 206. In some embodiments, the model-source drawing 202 comprises an unstylized source drawing created by an artist in a rest pose. In some such cases, the unstylized source drawing includes separately drawn segments with complete shapes to ensure that the stylized-puppet-animation system can identify a segment (or a portion of the segment) obscured by another segment, such as a torso obscuring an arm. In some cases, the artist specifies important semantic details within a segment for preservation, such as facial features or cloth draping. In the alternative to receiving an unstylized source drawing, in certain implementations, the stylized-puppet-animation system or the artist identifies a source drawing from among a source-character-animation sequence as the model-source drawing 202. Regardless of how the model-source drawing 202 is identified, the stylized-puppet-animation system identifies the source skeleton 210 upon which the model-source drawing 202 is based (e.g., by receiving an indication from a client device associated with a user).

After identifying the model-source drawing 202, the stylized-puppet-animation system creates the semantic layers 204a-204f. The term "semantic layer" refers to a semantically meaningful portion of a model-source drawing. For example, as shown in FIG. 2A, the semantic layers 204a-204f represent natural portions of an animation character in the model-source drawing 202, with segments corresponding to different body parts of the animation character. In particular, the semantic layer 204a corresponds to a head; the semantic layer 204b corresponds to a first arm; the semantic layer 204c corresponds to a second arm; the semantic layer 204d corresponds to a torso; the semantic layer 204e correspond to a first leg; and the semantic layer 204f corresponds to a second leg. The semantic layers 204a-204f shown in FIG. 2 are merely examples. In some embodiments, semantic layers correspond to additional body parts or parts of an animated animal, furniture, instrument, plant, machine, toy, or vehicle.

As further shown in FIG. 2A, after creating the semantic layers 204a-204f, the stylized-puppet-animation system identifies junctions at which each of the semantic layers 204a-204f connect to one or more of the semantic layers 204a-204f. FIG. 2A depicts the junctions as solid circles. The junctions indicate connection points at which the semantic layers 204a-204f naturally connect. For example, a first junction connects a head of the model-source drawing 202 to a torso's neck of the model-source drawing 202; a second junction connects a first arm of the model-source drawing 202 to a first shoulder point of the model-source drawing 202; and a third junction connects a second arm of the model-source drawing 202 to a second shoulder point of the model-source drawing 202. The junctions shown in FIG. 2 are merely examples. In certain implementations, junctions connect parts of any type of animate character.

In addition to identifying junctions, the stylized-puppet-animation system identifies joints 212a-212n of the source skeleton 210 and assigns the joints 212a-212n to corresponding locations 208a-208n of the model-source drawing 202. In some implementations, the stylized-puppet-animation system attaches each of the semantic layers 204a-204f to the source skeleton 210 at the corresponding locations

208*a*-208*n*. The corresponding locations 208*a*-208*n* define correspondence between bones or segments of the source skeleton 210 and the semantic layers 204*a*-204*f*. The corresponding locations 208*a*-208*n* indicate correspondence points that connect the model-source drawing 202 to the source skeleton 210.

Turning back now to FIG. 2B, this figure depicts a style-aware puppet for a source drawing of a source-character-animation sequence. As shown in FIG. 2B, the stylized-puppet-animation system generates the style-aware puppet by registering the layered-template puppet 206 to the source drawing in a frame of the source-character-animation sequence 106. Upon registration, the style-aware puppet comprises the layered-template puppet 206, a character-deformation model 214 of the source drawing, a skeletal-difference map 220 corresponding to the source drawing, and a visual-texture representation 224 of the source drawing.

As depicted by FIG. 2B, the stylized-puppet-animation system registers the layered-template puppet 206 to a source drawing from the source-character-animation sequence 106. As used in this disclosure, registering a layered-template puppet to a source drawing refers to associating or correlating the layered-template puppet with a source drawing (e.g., associating or correlating a puppet with a source drawing in an array or database). For illustrative purposes, FIG. 2B depicts the stylized-puppet-animation system registering the layered-template puppet 206 to the source drawing 108*b*, which differs from the model-source drawing 202. When generating the style-aware puppets for the source-character-animation sequence 106 in its entirety, the stylized-puppet-animation system registers the layered-template puppet 206 to each of the source drawings 108*a*-108*f* (e.g., frames) of the source-character-animation sequence 106. Accordingly, in some implementations, the style-aware puppet for each of the source drawings 108*a*-108*f* comprises the layered-template puppet 206.

As part of registering the layered-template puppet 206, the stylized-puppet-animation system generates the character-deformation model 214 for the source drawing 108*b*. As used in this disclosure, the term "character-deformation model" refers to a digital framework, array, mesh, or map indicating changes in orientation, position, or shape of an animation character in relation to a reference. In particular, a character-deformation model includes a framework or map reflecting a change in orientation, position, or shape of a source drawing with reference to a layered-template puppet. Such a framework or map can indicate changes in both coarse and residual orientation, position, or shape of an animation character's segments. As shown in FIG. 2B, for instance, the character-deformation model includes both a coarse-deformation model 216 and a residual-deformation model 218 for the source drawing 108*b*.

The stylized-puppet-animation system determines the coarse-deformation model 216 of the source drawing 108*b* with reference to the layered-template puppet 206. As used in this disclosure, the term "coarse-deformation model" refers to a digital framework, mesh, array, or map indicating global changes in orientation, position, or shape of one or more segments of an animation character in relation to a reference (e.g., with respect to a layered-template puppet). FIG. 2B, for instance, depicts the coarse-deformation model 216 as a framework indicating changes of the semantic layers 204*a*-204*f* in the source drawing 108*b* with respect to the layered-template puppet 206.

To determine the coarse-deformation model 216, in some implementations, the stylized-puppet-animation system generates a layered mesh for the layered-template puppet 206, where the layered mesh comprises mesh layers corresponding to the semantic layers 204*a*-204*f* of the layered-template puppet 206. The stylized-puppet-animation system further adjusts the mesh layers of the layered mesh to conform to the semantic layers 204*a*-204*f* positioned according to the source drawing 108*b*. This disclosure provides an example and additional description the stylized-puppet-animation system determining a coarse-deformation model below with respect to FIG. 3.

In addition to the coarse-deformation model 216, the stylized-puppet-animation system determines the residual-deformation model 218 of the source drawing 108*b* with reference to the layered-template puppet 206. As used in this disclosure, the term "residual-deformation model" refers to a framework or map indicating local changes in orientation, position, or shape within one or more segments of an animation character in relation to a reference (e.g., with respect to a layered-template puppet). As shown in FIG. 2B, for instance, the residual-deformation model 218 represents a map indicating local changes within the semantic layers 204*a*-204*f* in the source drawing 108*b* with respect to the layered-template puppet 206.

To determine the residual-deformation model 218, in some implementations, the stylized-puppet-animation system rectifies each segment of the source drawing 108*b* by removing the coarse-deformation model from the layered-template puppet 206. The stylized-puppet-animation system further performs an elastic registration of the layered-template puppet 206 to a rectified version of the source drawing 108*b*. Upon performing the elastic registration, the residual-deformation model 218 encodes subtle shape changes within individual segments. This disclosure provides an example and additional description of the stylized-puppet-animation system determining a residual-deformation model below with respect to FIG. 3.

As further shown in FIG. 2B, the stylized-puppet-animation system generates the skeletal-difference map 220 corresponding to the source drawing 108*b*. The term "skeletal-difference map" refers to differences between a source-skeletal pose and a stylized-skeletal pose corresponding to a source drawing. In some implementations, the term "skeletal-difference map" refers to differences between root-joint positions, bone lengths, and joint rotations of a source-skeletal pose and a stylized-skeletal pose corresponding to a source drawing.

As shown in FIG. 2B, for instance, the skeletal-difference map 220 comprises differences between root-joint positions, bone lengths, and joint rotations of the source-skeletal pose 104*b* and a stylized-skeletal pose 222 corresponding to the source drawing 108*b*. In particular, the stylized-skeletal pose 222 is a two-dimensional representation of a skeleton specified by a root-joint position, bone lengths, and joint rotations in the ancestor bone's reference frame. To create the stylized-skeletal pose 222, the stylized-puppet-animation system determines joint positions of the layered-template puppet 206 positioned according to the source drawing 108*b* based on attachment points of the mesh layers from the coarse-deformation model 216. As suggested above, the mesh layers of the coarse-deformation model 216 correspond to the semantic layers 204*a*-204*f* of the layered-template puppet 206.

The stylized-puppet-animation system further infers a root-joint position, bone lengths, and joint rotations for the stylized-skeletal pose 222 based on the joint positions of the layered-template puppet 206. Based on the inferred root-join position, bone lengths, and joint rotations, the stylizedpuppet-animation system generates the stylized-skeletal pose 222. In certain implementations, the stylized-puppet-animation system determines the skeletal-difference map 220 by determining differences between root-joint positions, bone lengths, and joint rotations of the source-skeletal pose 104b and the stylized-skeletal pose 222.

As further shown in FIG. 2B, the stylized-puppet-animation system generates the visual-texture representation 224. As used in this disclosure, the term "visual-texture representation" refers to a color, pattern, shading, stroke marks, and/or other distinctive stylistic marks created by an artist for an animation character in a source drawing. In some cases, the term "visual-texture representation" refers to color pixels indicating a pattern, shading, stroke marks, and/or other distinctive stylistic marks of segments of an animation character in a source drawing. As indicated in FIG. 2B, the stylized-puppet-animation system generates the visual-texture representation 224 by storing pixels from the source drawing 108b.

To further describe a style-aware puppet $P_s$, the symbols P, $P_d$, $P_r$, $P_p$ and $P_t$ may represent a layered-template puppet, coarse-deformation model, residual-deformation model, skeletal-difference map, and visual-texture representation, respectively. For an individual source drawing within a character frame, i, of a source-character-animation sequence, a style-aware puppet $P_s$ may comprise a layered-template puppet P, a coarse-deformation model $P_d(i)$, a residual-deformation model $P_r(i)$, a skeletal-difference map $P_p(i)$, and a visual-texture representation $P_t(i)$. Accordingly, in some embodiments, a style-aware puppet $P_s$ comprises a layered-template puppet P and a style-aware tuple [$P_d$, $P_r$, $P_p$, $P_t$] for a particular character frame corresponding to a source drawing.

As suggested above, the individual source drawing corresponds to a skeletal frame $S_o(i)$ that includes a source-skeletal pose and a stylized-skeletal pose $S_p(i)$. Using this notation, the stylized-puppet-animation system determines the skeletal-difference map $P_p(i)$ as differences between root-joint positions, bone lengths, and joint rotations of the source-skeletal pose $S_o(i)$ and a stylized-skeletal pose $S_p(i)$. Put differently, $P_p(i)=S_o(i)-S_p(i)$.

Figures 3A, 3B:
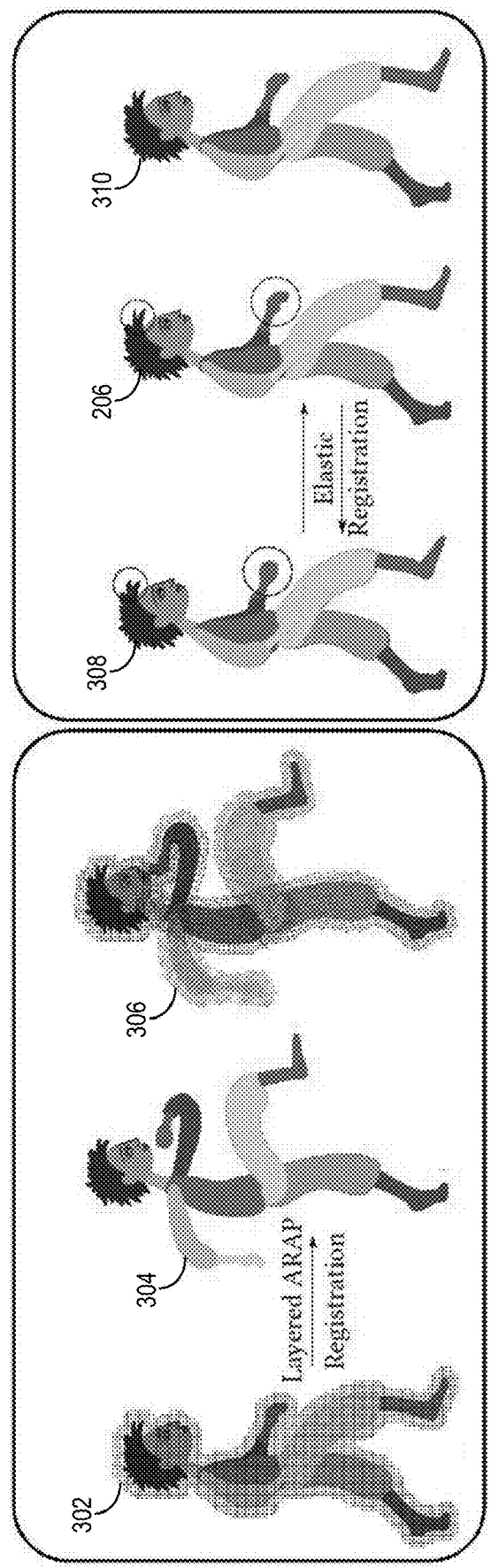
FIGS. 3A-3B illustrate the stylized-puppet-animation system generating and removing a coarse-deformation model and a residual-deformation model of a source drawing in accordance with one or more embodiments.

As noted above, in some implementations, the stylized-puppet-animation system determines a coarse-deformation model and a residual-deformation model for a source drawing. FIGS. 3A and 3B illustrate the stylized-puppet-animation system both generating and removing a coarse-deformation model and a residual-deformation model. As depicted in FIGS. 3A and 3B, the stylized-puppet-animation system uses a coarse-to-fine strategy for a character-deformation model through which the system determines a coarse-deformation model for a source drawing and then extracts a corresponding residual-deformation model. In some implementations, the stylized-puppet-animation system further removes the coarse-deformation model and the residual-deformation model to prepare a layered-template puppet for blending of visual texture representations from different style-aware puppets. This coarse-to-fine strategy improves upon existing registration methods and encodes accurate deformations for a source drawing.

As indicated in FIG. 3A, the stylized-puppet-animation system registers the layered-template puppet 206 to a segmented source drawing 304 using a layered as-rigid-as-possible ("ARAP") mesh 302 to create a coarse-deformation model 306. The stylized-puppet-animation system creates a multi layered ARAP mesh comprising ARAP mesh layers corresponding to the semantic layers 204a-204f of the layered-template puppet 206. The stylized-puppet-animation system thus exploits a layered-template puppet to create a more accurate and sensitive ARAP mesh to determine coarse deformation in a source drawing.

To register the layered-template puppet 206 to the segmented source drawing 304, in some implementations, the stylized-puppet-animation system uses both a pushing phase and a regularization phase for each ARAP mesh layer. During the pushing phase, the stylized-puppet-animation system shifts intersection points of an ARAP mesh layer from the layered ARAP mesh 302 toward corresponding locations of a semantic layer portrayed in a source drawing. The stylized-puppet-animation system shifts such intersection points using a block-matching algorithm. During the regularization phase, the stylized-puppet-animation system realigns connections within the ARAP mesh layer to regularize a lattice of the ARAP mesh layer. The stylized-puppet-animation system iteratively undergoes the pushing phase and regularization phase for each ARAP mesh layer until the layered ARAP mesh 302 conforms to the semantic layers 204a-204f of the layered-template puppet 206 positioned according to the segmented source drawing 304.

As shown in FIG. 3A, the coarse-deformation model 306 comprises the layered ARAP mesh 302 conformed to the semantic layers 204a-204f of the layered-template puppet 206, which is positioned according to the segmented source drawing 304. In some embodiments, the stylized-puppet-animation system uses the ARAP image registration algorithm described by Daniel Sýkora et al., "As-Rigid-As-Possible Image Registration for Hand-Drawn Cartoon Animations," *Proceedings of International Symposium on Non-Photorealistic Animation and Rendering* 25-33 (2009), the entire contents of which are hereby incorporated by reference. In some such embodiments, the stylized-puppet-animation system adapts a pushing phase so that the block-matching algorithm only uses content of the corresponding semantic layer to shift each ARAP mesh layer.

As depicted in FIG. 3A, the stylized-puppet-animation system automatically registers a layered-template puppet to the segmented source drawing 304. In some cases, however, the stylized-puppet-animation system can receive indications from a client device to adjust an intersection point of an ARAP mesh layer to shift the intersection point toward a corresponding location of a semantic layer of the layered-template puppet 206. This manual intervention facilitates the registration process to correct possible misalignments for challenging configurations (e.g., when a coarse deformation differs significantly from a layered-template puppet).

As indicated in FIG. 3B, the stylized-puppet-animation system registers the layered-template puppet 206 to a rectified source drawing 308 comprising a residual-deformation model. In particular, the stylized-puppet-animation system removes the coarse-deformation model 306 from the segmented source drawing 304 to create the rectified source drawing 308. As shown here, the rectified source drawing 308 reflects the residual deformation from the residual-deformation model 218. The stylized-puppet-animation system then registers the rectified source drawing 308 to the layered-template puppet 206 using an elastic-registration method. For example, in some embodiments, the stylized-puppet-animation system generates a deformation field for each semantic layer of the layered-template puppet 206 during the elastic-registration method. In certain implementations, the stylized-puppet-animation system registers the rectified source drawing 308 to the layered-template puppet 206 using the elastic-registration method described by Ben Glocker et al., "Dense Image Registration Through MRFs and Efficient Linear Programming," *Medial Image Analysis*, Vol. 12, No. 6, 731-741 (2008), the entire contents of which are incorporated by reference.

By generating a deformation field for each semantic layer, the stylized-puppet-animation system creates deformation fields corresponding to the semantic layers segments of the layered-template puppet 206. FIG. 2B depicts the residual-deformation model 218 as an example of a residual-deformation model comprising such multiple deformation fields. By way of comparison, FIG. 3B depicts the rectified source drawing 308 and the layered-template puppet 206 side by side. As indicated by the rectified source drawing 308, the residual-deformation model captures subtle deformations that are not present in the semantic layers 204a-204f of the layered-template puppet 206 prior to the residual deformation, such as the residual deformation indicated by the subtle changes to the shape of a hand and hair between the rectified source drawing 308 and the layered-template puppet 206.

As further shown in FIG. 3B, in one or more embodiments, the stylized-puppet-animation system removes both the coarse-deformation model 306 and the residual-deformation model from the layered-template puppet 206 to create a segmented-stylized-source drawing 310. In some embodiments, the segmented-stylized-source drawing 310 includes pixels that include a rectified visual texture. As explained further below, after removing a coarse-deformation model and a residual-deformation model from a layered-template puppet, the stylized-puppet-animation system blends the rectified visual texture of a style-aware puppet with the rectified visual texture of other style-aware puppets to create a modified-visual-texture representation.

Figure 4:
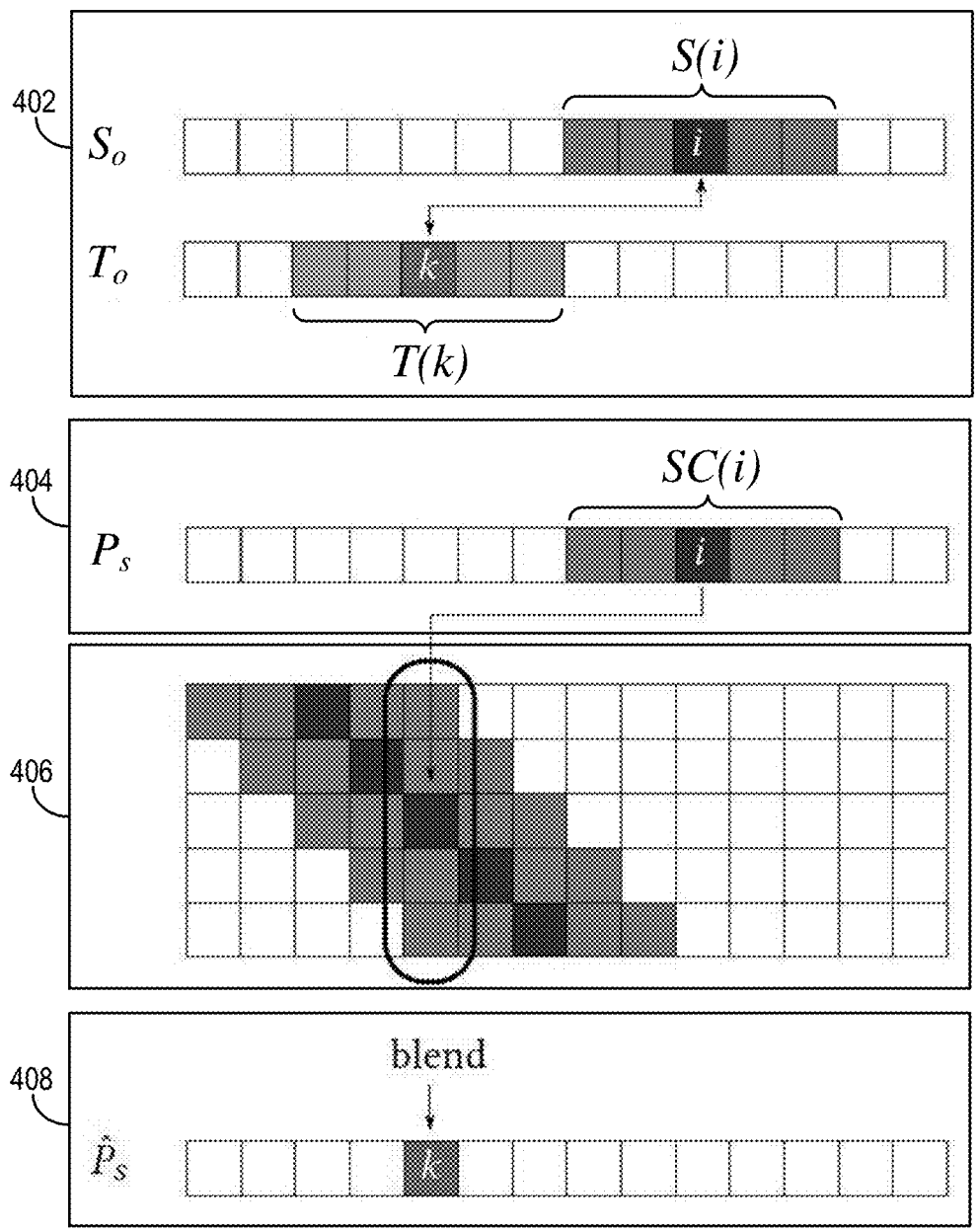
FIG. 4 illustrates the stylized-puppet-animation system selecting a set of source drawings analogous to a target-skeletal pose and blending style-aware puppets corresponding to the set of source drawings to create a target-style-aware puppet in accordance with one or more embodiments.

As noted above, in addition to generating style-aware puppets by registering a layered-template puppet to source drawings, the stylized-puppet-animation system uses style-aware puppets for the source drawings to transfer the visual appearance and stylized motion of an animation character from a source-character-animation sequence to a target-character animation sequence. As part of transferring the stylized motion, the stylized-puppet-animation system selects a set of source drawings analogous to a target-skeletal pose and blends the style-aware puppets corresponding to the set of source drawings to create a target-style-aware puppet corresponding to the target-skeletal pose. FIG. 4 illustrates an example of this selection and blending process.

As shown in FIG. 4, the stylized-puppet-animation system performs an act 402 of identifying a source subsequence of skeletal frames S(i) analogous to the target subsequence of skeletal frames T(k). When performing the act 402, the stylized-puppet-animation system identifies a target source frame k and the target subsequence of skeletal frames T(k) from a target-skeletal-animation sequence $T_o$, where the target subsequence of skeletal frames T(k) includes a set of target-skeletal poses. From among a source-skeletal-animation sequence $S_o$, the stylized-puppet-animation system selects a source subsequence of skeletal frames S(i) analogous to the target subsequence of skeletal frames T(k). The source subsequence of skeletal frames S(i) includes a set of corresponding source-skeletal poses.

As further shown in FIG. 4, from among a source-character-animation sequence $S_s$, the stylized-puppet-animation system performs an act 404 of identifying a source subsequence of character frames SC(i) corresponding to the source subsequence of skeletal frames S(i). Each character frame of the source subsequence of character frames SC(i) includes a source drawing and corresponds to a style-aware puppet P. In addition to identifying the source subsequence of character frames SC(i), the stylized-puppet-animation system performs an act 406 of identifying overlapping source subsequences of character frames. As shown the overlapping source subsequences of character frames includes the source subsequence of character frames SC(i).

As further indicated by an act 408 in FIG. 4, the stylized-puppet-animation system blends the style-aware puppets corresponding to the overlapping source subsequences of character frames to generate a target-style-aware puppet $\hat{P}_s$. This target-style-aware puppet $\hat{P}_s$ corresponds to the target source frame k. Using a similar approach, the stylized-puppet-animation system generates a target-style-aware puppet $\hat{P}_s$ corresponding to each target source frame k of the target-skeletal-animation sequence $T_o$.

As indicated by FIG. 4, in the acts 402, 404, and 406, the stylized-puppet-animation system uses subsequences of 2N+1 skeletal frames from the target-skeletal-animation sequence $T_o$ and subsequences of 2N+1 skeletal frames from the source-skeletal-animation sequence $S_o$. For example, a subsequence of 2N+1 skeletal frames comprises a first skeletal frame and two pairs of adjacent skeletal frames on either side of the first skeletal frame. Accordingly, as shown in the act 402, the stylized-puppet-animation system identifies a target subsequence of skeletal frames T(k) comprising five skeletal frames and a source subsequence of skeletal frames S(i) comprising five skeletal frames. The subsequences of 2N+1 in FIG. 4 are merely illustrative. In alternative embodiments, the stylized-puppet-animation system may use subsequences of 1N+1, 3N+1, or any other logical configuration of subsequences.

As further indicated by FIG. 4, during the act 402, the stylized-puppet-animation system selects the source subsequence of skeletal frames S(i) analogous to the target subsequence of skeletal frames T(k). In one or more embodiments, the stylized-puppet-animation system identifies analogous frames by comparing trajectories of joints across skeletal poses. In particular, the stylized-puppet-animation system compares the trajectories of joints from a set of target-skeletal poses within the target subsequence of skeletal frames T(k) to trajectories of joints from a set of source-skeletal poses within the source subsequence of skeletal frames S(i).

In some such implementations, the stylized-puppet-animation system selects a source subsequence of skeletal frames S(i)=$S_o$[(i−N) . . . (i+N)] for each target subsequence of skeletal frames T(k)=$T_o$[(k−N) . . . (k+N)] using a pose-similarity metric described by Lucas Kovar et al., "Motion Graphs," *ACM Transactions on Graphics* Vol. 21, No. 3, 473-482 (2002) (hereinafter "Kovar"), the entire contents of which are incorporated by reference. For instance, the stylized-puppet-animation system can remove global translation and exploit the sum of distances between point clouds formed by trajectories of joints in the set of source-skeletal poses within the source subsequence of skeletal frames S(i) and trajectories of joints in the set of target-skeletal poses within the target subsequence of skeletal frames T(k).

In some embodiments, to select a source subsequence of skeletal frames S(i) analogous to a target subsequence of skeletal frames T(k), the stylized-puppet-animation system applies a pose-similarity metric to (i) each joint from the source-skeletal poses within the source-skeletal-animation sequence $S_o$ and (ii) each joint from the target-skeletal poses within the target-skeletal-animation sequence $T_o$. Alternatively, in certain embodiments, the stylized-puppet-animation system applies the pose-similarity metric to (i) a subset of joints from the source-skeletal poses within the source-skeletal-animation sequence $S_o$ and (ii) a corresponding subset of joints from the target-skeletal poses within the target-skeletal-animation sequence $T_o$. By using a subset of joints, the stylized-puppet-animation system can select a source subsequence of skeletal frames S(i) analogous to a target subsequence of skeletal frames T(k) based on joints for different portions of a target skeleton and a source skeleton, such as an upper portion (e.g., torso, arms, and head) and a lower portion (e.g., legs) of the target skeleton and the source skeleton. By matching portions of skeletal poses, the stylized-puppet-animation system can apply more flexibility in transferring a stylized motion from a source-character-animation sequences to a larger variety of target motions. For instance, in some embodiments, the stylized-puppet-animation system can blend different portions of different source animation characters in generating a target-character-animation sequence.

FIG. 4 illustrates merely one potential method by which the stylized-puppet-animation system selects target subsequence of skeletal frames. The stylized-puppet-animation system may select a source subsequence of skeletal frames that is analogous to (or similar to) a target subsequence of skeletal frames using a variety of methods. For example, in some embodiments, the stylized-puppet-animation system aligns a target-skeletal-animation sequence $T_o$ and a source-skeletal-animation sequence $S_o$ such that each skeletal frame of the target-skeletal-animation sequence $T_o$ aligns with a corresponding skeletal frame from of the source-skeletal-animation sequence $S_o$. The stylized-puppet-animation system subsequently selects a source subsequence of skeletal frames comprising skeletal frames that align with each skeletal frame of the target subsequence of skeletal frames.

After performing the act 402 by selecting the source subsequence of skeletal frames S(i), the stylized-puppet-animation system performs the act 404 by identifying a source subsequence of character frames SC(i) from among a source-character-animation sequence $S_s$. As indicated by FIG. 4, the source subsequence of character frames SC(i) correspond to the source subsequence of skeletal frames S(i). To help illustrate this correspondence, as depicted in FIG. 1, the source-skeletal poses 104a-104e from the source-skeletal-animation sequence 102 similarly correspond to the source drawings 108a-108e from the source-character-animation sequence 106.

As further indicated by the act 406 of FIG. 4, the stylized-puppet-animation system identifies additional source subsequences of character frames from the source-character-animation sequence $S_s$ that overlap with the source subsequence of character frames SC(i). A first source subsequence of character frames may overlap with a second source subsequence of character frames in a variety of ways. For example, in some implementations, at least one character frame from the first source subsequence of character frames may overlap with at least one character frame from the second source subsequence of character frames. In certain embodiments, the first source subsequence of character frames includes each character frame (or a threshold number of character frames) from the second source subsequence of character frames.

In the example shown for the act 406, the stylized-puppet-animation system identifies four additional source subsequences of character frames, where each additional source subsequence encompasses a character frame (depicted as a dark-shaded box) from the source subsequence of character frames SC(i) and a pair of additional character frames (depicted as lighter-shaded boxes) on both sides the character frame. As further shown in FIG. 4, the stylized-puppet-animation system identifies four such additional source subsequences of character frames that overlap with the source subsequence of character frames SC(i). Because each character frame includes a source drawing, the character frames within the additional source subsequences of character frames likewise overlap with the source drawings within the source subsequence of character frames SC(i). Each character frame of the source subsequence of character frames SC(i) and the additional source subsequences of character frames corresponds to a unique style-aware puppet $P_s$.

After identifying overlapping source subsequences of character frames, the stylized-puppet-animation system performs the act 408 by blending the style-aware puppets corresponding to the source subsequence of character frames SC(i)—and to the additional source subsequences of character frames—to generate a target-style-aware puppet $\hat{P}_s$ that corresponds to the target source frame k. By blending the style-aware puppets corresponding to the overlapping source subsequences, the stylized-puppet-animation system blends the style-aware tuple $[P_d, P_r, P_p, P_t]$ corresponding to the style-aware puppet $P_s$ for each character frame within the overlapping source subsequences. In some embodiments, the stylized-puppet-animation system weights the style-aware tuple $[P_d, P_r, P_p, P_t]$ corresponding to the style-aware puppet $P_s$ for each character frame based on the number of instances the character frame for that style-aware puppet $P_s$ is present within the overlapping source subsequences of character frames.

The stylized-puppet-animation system may blend style-aware puppets in a variety of ways. For example, in some embodiments, the stylized-puppet-animation system assigns a weight to each character frame within a source subsequence of character frames and determines a weighted average of the style-aware tuples (or a subset of the style-aware tuples) corresponding to each character frame. Alternatively, in some embodiments, the stylized-puppet-animation system determines an average of one or more components of the style-aware tuples that correspond to the source subsequence of skeletal frames S(i) or to the source subsequence of character frames SC(i).

When the stylized-puppet-animation system blends style-aware puppets, in some implementations, the stylized-puppet-animation system interpolates coarse-deformation models for the style-aware puppets to create a modified-coarse-deformation model $\hat{P}_d$ for the target-style-aware puppet $\hat{P}_s$. In some such embodiments, the stylized-puppet-animation system uses an N-way ARAP interpolation described by William Baxter et al., "N-Way Morphing for 2D Animation," *Journal of Visualization and Computer Animation* Vol. 20, Nos. 2-3, 79-87 (2009), the entire contents of which are hereby incorporated by reference.

To blend residual-deformation models, in some cases, the stylized-puppet-animation system linearly blends residual-deformation models for the style-aware puppets to create a modified-residual-deformation model $\hat{P}_r$ for the target-style-aware puppet $\hat{P}_s$. Similarly, in some embodiments, the stylized-puppet-animation system linearly blends skeletal-difference maps for the style-aware puppets to create a modified-skeletal-difference map $P_p$ for the target-style-aware puppet $\hat{P}_s$. When blending the residual-deformation models or skeletal-difference maps, in some implementations, the stylized-puppet-animation system uses a linear-blend technique described by Seungyong Lee et al., "Polymorph: Morphing Among Multiple Images," *IEEE Computer Graphics and Applications*, Vol. 18, No. 1, 58-71 (1998), the entire contents of which are hereby incorporated by reference.

When blending the visual-texture representations for the style-aware puppets, in some cases, the stylized-puppet-animation system rectifies the visual-texture representations for each style-aware puppet—based on the coarse-deformation model for the style-aware puppet and the residual-deformation model for the style-aware puppet. In some such implementations, and as depicted in FIG. 3B, the stylized-puppet-animation system rectifies a visual-texture representation $P_t$ by removing the coarse-deformation model $P_d$ and the residual-deformation model $P_r$ for the style-aware puppet $P_s$. After rectifying the visual-texture representations, the stylized-puppet-animation system blends pixel colors of the rectified visual-texture representations to create a modified-visual-texture representation $\hat{P}_t$ for the target-style-aware puppet $\hat{P}_s$.

Upon blending, the resulting target-style-aware puppet $\hat{P}_s$ comprises a modified-style-aware tuple $[\hat{P}_d, \hat{P}_r, \hat{P}_p, \hat{P}_t]$. Put differently, for the target-style-aware puppet $\hat{P}_s$, the modified style-aware tuple includes a modified-coarse-deformation model $\hat{P}_d$, a modified-residual-deformation model $\hat{P}_r$, a modified-skeletal-difference map $\hat{P}_p$, and a modified-visual-texture representation $\hat{P}_t$. Consistent with the disclosure above, in some implementations, the stylized-puppet-animation system generates a target-style-aware puppet $\hat{P}_s$ corresponding to each target source frame k within the target-skeletal-animation sequence $T_o$.

Figure 5:
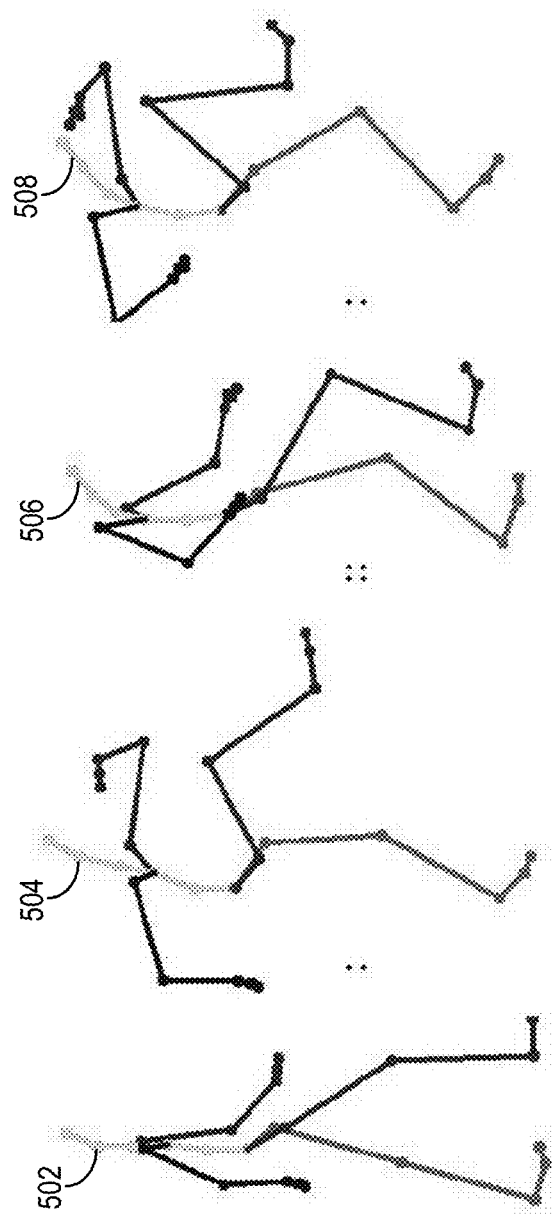
FIG. 5 illustrates the stylized-puppet-animation system applying a modified-skeletal-difference map to a target skeleton in a target-skeletal pose to generate a stylized-target-skeletal pose in accordance with one or more embodiments.

In addition to generating target-style-aware puppets, in some embodiments, the stylized-puppet-animation system applies a modified-skeletal-difference map $\hat{P}_p$ to a target skeletal in a target-skeletal pose to generate a target-stylized-skeletal pose. As part of transferring the stylized motion of an animation character from the source-character-animation sequence $S_s$ to the target-skeletal-animation sequence $T_o$, the stylized-puppet-animation system applies a modified-skeletal-difference map $\hat{P}_p$ for each target-style-aware puppet $\hat{P}_s$ to a target skeletal in a corresponding target-skeletal pose to generate a sequence of target-stylized-skeletal poses. FIG. 5 illustrates an example of applying a modified-skeletal-difference map $\hat{P}_p$ to a target skeleton in a target-skeletal pose.

As shown in FIG. 5, the stylized-puppet-animation system applies a modified-skeletal-difference map $\hat{P}_p$ to a target skeleton in a target-skeletal pose 506 to generate a stylized-target-skeletal pose 508 of a target skeleton in accordance with one or more embodiments. Consistent with the disclosure above, the stylized-puppet-animation system blends skeletal-difference maps for style-aware puppets corresponding to overlapping source subsequences of character frames to create the modified-skeletal-difference map $\hat{P}_p$ for a target-style-aware puppet.

For example, FIG. 5 shows a skeletal-difference map $P_p$ corresponding to a character frame from among the overlapping source subsequences. In particular, the skeletal-difference map $P_p$ comprises differences between root-joint positions, bone lengths, and joint rotations of a source-skeletal pose 502 and a stylized-skeletal pose 504 corresponding to a source drawing. Similarly, the modified-skeletal-difference map $\hat{P}_p$ comprises differences between root-joint positions, bone lengths, and joint rotations of the target-skeletal pose 506 and the stylized-target-skeletal pose 508 corresponding to a target drawing.

FIG. 5 illustrates that the source-skeletal pose 502 is to the stylized-skeletal pose 504 as the target-skeletal pose 506 is to the stylized-target-skeletal pose 508. By creating a stylized-target-skeletal pose corresponding to each target-skeletal pose from a target-skeletal-animation sequence, the stylized-puppet-animation system also creates a stylized-target-skeletal pose corresponding to each target drawing of a target-character-animation sequence.

Although not shown in FIG. 5, in some embodiments, the stylized-puppet-animation system enforces constraints on stylized-target-skeletal poses. For instance, in certain implementations, the stylized-puppet-animation system applies the modified-skeletal-difference map $\hat{P}_p$ to a target skeleton in a target-skeletal pose to generate a stylized-target-skeletal pose of a target skeleton. The stylized-puppet-animation system subsequently adjusts the stylized-target-skeletal pose to ensure that a change in position of a root-joint, a change in bone length, or a joint rotation of the target skeleton comes within a threshold change in position, change in bone length, or joint rotation, respectively.

Figure 6:
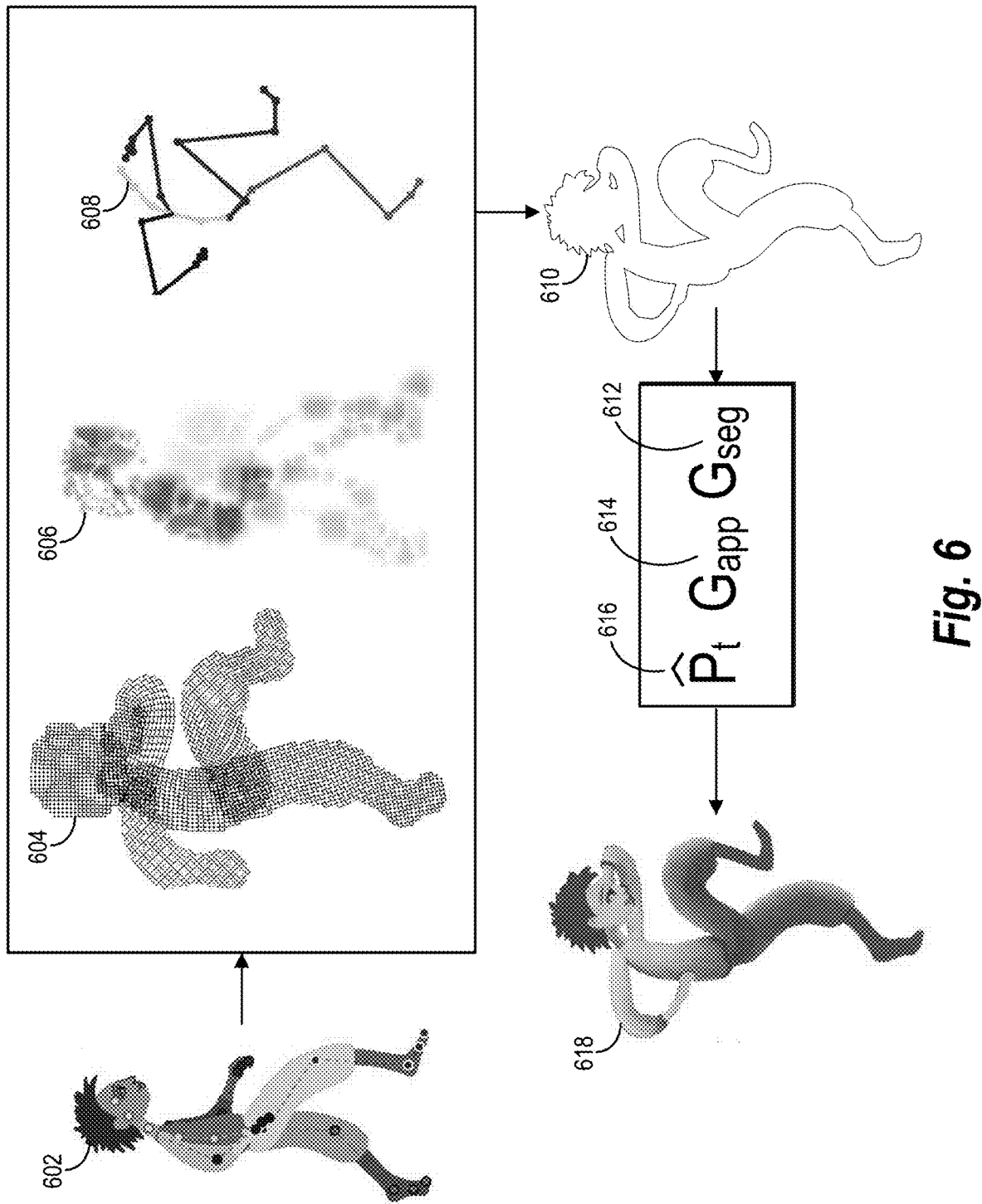
FIG. 6 illustrates the stylized-puppet-animation system generating an animation character for a target drawing based on a modified-coarse-deformation model, a modified-residual-deformation model, a stylized-target-skeletal pose, and a modified-skeletal-difference map in accordance with one or more embodiments.

After creating stylized-target-skeletal poses, the stylized-puppet-animation system generates target drawings for a target-character-animation sequence based on target-style-aware puppets and stylized-target-skeletal poses. FIG. 6 depicts an example of the stylized-puppet-animation system generating an animation character portrayed in a target drawing 618. In general, the stylized-puppet-animation system generates a target-puppet configuration 610 based on a modified-coarse-deformation model 604, a modified-residual-deformation model 606, and a stylized-target-skeletal pose 608. As further indicated by FIG. 6, the stylized-puppet-animation system subsequently applies visual texture from a modified-visual-texture representation 616 to the layered-template puppet 602 to generate the target drawing 618 based on one or both of a segmentation-guidance channel 612 and a temporal-appearance-guidance channel 614.

As indicated by FIG. 6, the stylized-puppet-animation system transforms a layered-template puppet 602 into the target-puppet configuration 610. In particular, the stylized-puppet-animation system applies the modified-coarse-deformation model 604 and the modified-residual-deformation model 606 to the layered-template puppet 602. By applying the modified-coarse-deformation model 604 and the modified-residual-deformation model 606, the stylized-puppet-animation system changes the position and shape of semantic layers from the layered-template puppet 602. Consistent with the disclosure above, the stylized-puppet-animation system changes both the global and local position and shape of semantic layers from the layered-template puppet 602.

Moreover, the stylized-puppet-animation system warps the layered-template puppet 602 to conform to the stylized-target-skeletal pose 608. By warping the layered-template puppet 602, the stylized-puppet-animation system transforms the layered-template puppet 602 into the target-puppet configuration 610. The target-puppet configuration 610 thus places the layered-template puppet 602 in a stylized pose for the eventual target drawing 618.

After warping the layered-template puppet 602, the stylized-puppet-animation system applies the modified-visual-texture representation 616 based on two different types of guidance channels—the segmentation-guidance channel 612 and the temporal-appearance-guidance channel 614. In general, the stylized-puppet-animation system uses the segmentation-guidance channel 612 as a reference for rendering visual texture on the layered-template puppet 206 in the target-puppet configuration 610 based on segment-color labels for semantic layers of both a style-aware puppet and a corresponding target-style-aware puppet. Accordingly, in some cases, the stylized-puppet-animation system uses a first segmentation-guidance channel $G_{seg}^s$ comprising segment-color labels for semantic layers corresponding to a style-aware puppet $P_s$ of a source drawing and a second segmentation-guidance channel $G_{seg}^{\,t}$ comprising segment-color labels for semantic layers corresponding to a target-style-aware puppet $\hat{P}_s$. In some embodiments, the stylized-puppet-animation system uses a guided texture synthesis to implement a segmentation-guidance channel as described by Jakub Fišer et al., "Example-Based Synthesis of Stylized Facial Animations," ACM Transactions on Graphics, Vol. 36, No. 4, Article 155 (2017) (hereinafter "Fišer"), the entire contents of which are hereby incorporated by reference.

By using a segmentation-guidance channel to render visual texture based on segment-color labels, the stylized-puppet-animation system avoids rendering visual texture that mismatches semantic layers corresponding to a style-aware puppet of a source drawing with different semantic layers of a target-style-aware puppet (e.g., mismatching a semantic layer for an arm with a semantic layer for a torso). Such layer-by-layer guidance ensures that the stylized-puppet-animation system preserves the visual texture of important semantic details between semantic layers of a style-aware puppet for a source drawing and semantic layers of the corresponding target-style-aware puppet. For instance, the segmentation-guidance channel 612 preserves the visual texture of the eyes, nose, and mouth of the source drawing 108e shown in FIG. 1 in the target drawing 618 shown in FIG. 6.

In addition (or in the alternative) to the segmentation-guidance channel 612, in certain implementations, the stylized-puppet-animation system applies the modified-visual-texture representation 616 based on the temporal-appearance-guidance channel 614. In general, the stylized-puppet-animation system uses the temporal-appearance-guidance channel 614 as a guide to render a visual texture on the layered-template puppet 206 in the target-puppet configuration 610 based on smoothed visual-texture representations of a style-aware puppet and a corresponding target-style-aware puppet. In some embodiments, for instance, the stylized-puppet-animation system uses a first temporal-appearance-guidance channel $G_{app}^{\,s}$ comprising a smoothed visual-texture representation $P_t$ for semantic layers corresponding to a style-aware-puppet $P_s$ of a source drawing and a second temporal-appearance-guidance channel $G_{app}^{\,t}$ comprising a smoothed modified-visual-texture representation $\hat{P}_t$ for semantic layers corresponding to a target-style-aware puppet $\hat{P}_s$. The stylized-puppet-animation system uses the first temporal-appearance-guidance channel and the second temporal-appearance-guidance channel as reference points to render a smoothed version of the modified-visual-texture representation $\hat{P}_t$ on the layered-template puppet 206 in the target-puppet configuration 610.

When smoothing visual-texture representations, the stylized-puppet-animation system can use a joint-bilateral filter to smooth both the visual-texture representation $P_t$ for the first temporal-appearance-guidance channel and the modified-visual-texture representation $\hat{P}_t$ for the second temporal-appearance-guidance channel. In some such embodiments, the stylized-puppet-animation system smooths such visual-texture representations by using a joint-bilateral filter (instead of a Gaussian blur) in the smoothing technique described by Fišer or by Jakub Fišer et al., "Color Me Noisy: Example-Based Rendering of Hand-Colored Animations with Temporal Noise Control," Computer Graphics Forum, Vol. 33, No. 4, 1-10 (2014), the entire contents of which are hereby incorporated by reference.

By using a temporal-appearance-guidance channel, the stylized-puppet-animation system preserves temporal coherence in target drawings of a target-character-animation sequence. By combining a joint-bilateral filter to smooth the visual-texture representation $P_t$ corresponding to a style-aware puppet of a source drawing and the modified-visual-texture representation $\hat{P}_t$ corresponding to a target-style-aware puppet, the stylized-puppet-animation system avoids blurring visual textures across individual-segment boundaries—as some existing computer-animation systems currently do. Indeed, the stylized-puppet-animation system decreases the amount of temporal flickering between frames of a target-character-animation sequence by reducing the blur of visual texture between frames.

As further indicated by FIG. 6, in some embodiments, the stylized-puppet-animation system renders a smoothed version of the modified-visual-texture representation 616 on the layered-template puppet 602 in the target-puppet configuration 610 based on both the segmentation-guidance channel 612 and the temporal-appearance-guidance channel 614. In some cases, for instance, the stylized-puppet-animation system renders a smoothed version of a modified-visual-texture representation $\hat{P}_t$ based on the following relationship among guidance channels: the first segmentation-guidance channel $G_{seg}^{\,s}$ and the first temporal-appearance-guidance channel $G_{app}^{\,s}$ are to the visual-texture representation $P_t$ for the style-aware puppet $P_s$ as the second segmentation-guidance channel $G_{seg}^{\,t}$ and the second temporal-appearance-guidance channel $G_{app}^{\,t}$ are to a rendered visual-texture representation for the target drawing. By rendering smoothed visual-texture representations on the layered-template puppet 602 in various target-puppet configurations, the stylized-puppet-animation system synthesizes the target drawings for an entire target-character-animation sequence. In some such embodiments, the stylized-puppet-animation system combines the segmentation-guidance channel 612 and the temporal-appearance-guidance channel 614 with a StyLit algorithm to generate target drawings. As a point of reference, a StyLit algorithm is described by Jakub Fišer et al., "StyLit: Illumination-guided Example-based Stylization of 3D Renderings," ACM Transactions on Graphics, Vol. 36, No. 4, Article 155 (2017), the entire contents of which are hereby incorporated by reference.

FIG. 6 depicts merely one example of the stylized-puppet-animation system generating an animation character portrayed in a target drawing. The stylized-puppet-animation system may generate target drawings for a target-character-animation sequence using different approaches. For example, in some embodiments, the stylized-puppet-animation system applies a modified-style-aware tuple [$\hat{P}_d$, $\hat{P}_r$, $\hat{P}_p$, $\hat{P}_t$] to a layered-template puppet P. The stylized-puppet-animation system then smooths the modified-visual-texture representation $\hat{P}_t$ using a Gaussian blur or other filter to generate a target drawing.

In addition to generating target drawings for a target-character-animation sequence, in some embodiments, the stylized-puppet-animation system generates source drawings to complete a source-character-animation sequence. While a source-character-animation sequence may include a series of source drawings that collectively exhibit an animated motion, in certain embodiments, an artist or other user may provide (or computing device may generate) a subset of source drawings corresponding to a subset of source-skeletal poses of a source-skeletal-animation sequence. For example, a user may draw a few key source drawings for a source-character-animation sequence corresponding to a few key source-skeletal poses of a source-skeletal-animation sequence. By using only a subset of source drawings corresponding to a subset of source-skeletal poses, the stylizedpuppet-animation system can reduce the input from a user or a computing device to generate a target-character-animation sequence.

Similar to the process of generating target drawings, the stylized-puppet-animation system can generate source drawings to complete a source-character-animation sequence. For instance, the stylized-puppet-animation system can identify source-skeletal poses without corresponding source drawings. For a source-skeletal pose without a corresponding source drawing, the stylized-puppet-animation system interpolates and/or further adjusts a layered-template puppet to create a style-aware puppet corresponding to the source-skeletal pose. The stylized-puppet-animation system may thus generate a style-aware puppet corresponding to each source-skeletal pose without a corresponding source drawing. Consistent with the disclosure above, the stylized-puppet-animation system may further blend style-aware puppets to create target-style-aware puppets and generate a target-character-animation sequence of the animation character portrayed in target drawings.

Figure 7:
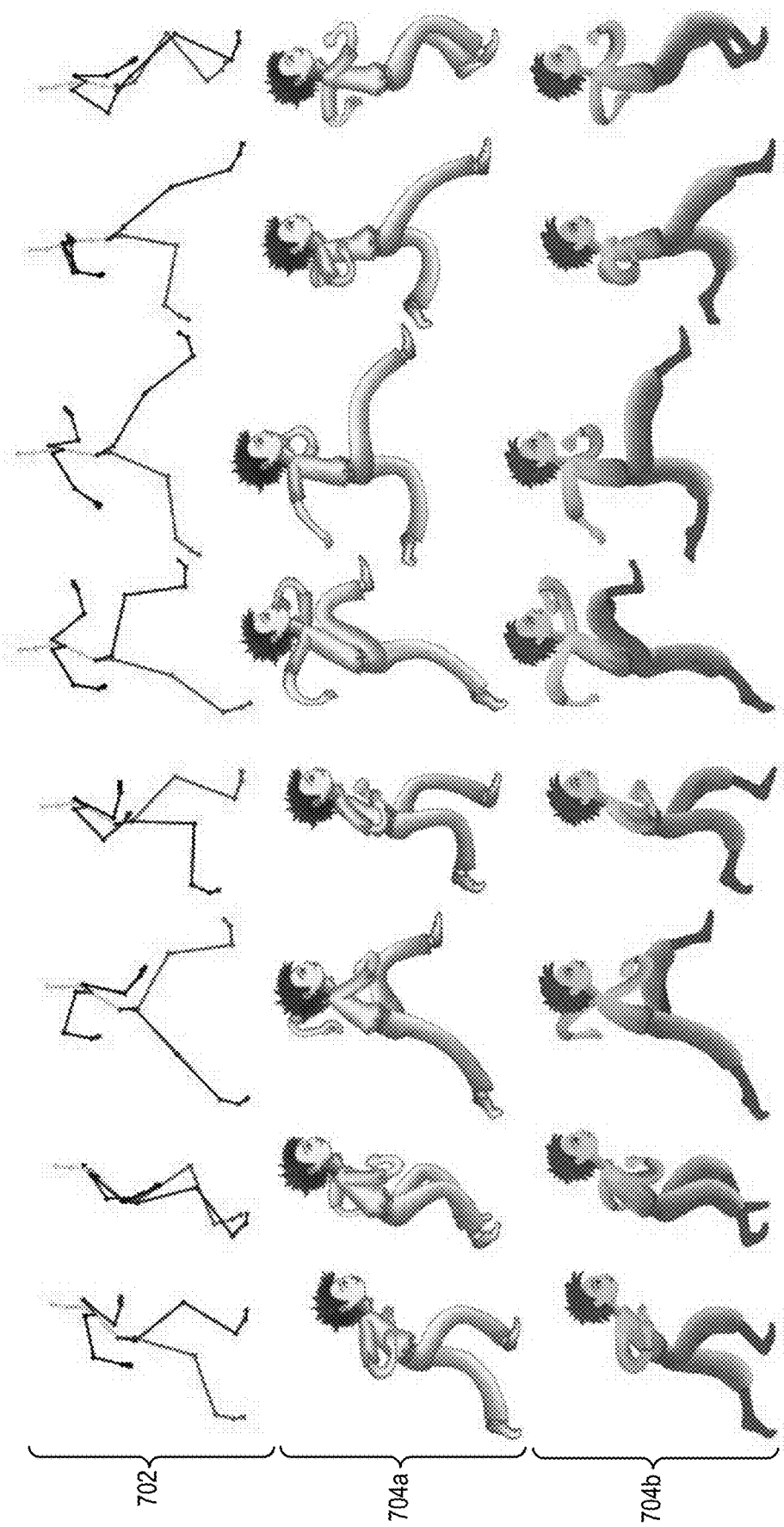
FIG. 7 illustrates the stylized-puppet-animation system using style-aware puppets to generate target-character-animation sequences from a target-skeletal-animation sequence in accordance with one or more embodiments.

As described above, the stylized-puppet-animation system both preserves and transfers a detailed visual appearance and stylized motion of an animation character from a source-character-animation sequence to a target-character-animation sequence. Similarly, the stylized-puppet-animation system can transfer the visual appearance and stylized motion of different animation characters from different source-character-animation sequences to a single target-skeletal-animation sequence to generate different target-character-animation sequences. FIG. 7 illustrates an example of the stylized-puppet-animation system generating different target-character-animation sequences based on the same target-skeletal-animation sequence.

As indicated in FIG. 7, the stylized-puppet-animation system generates a first target-character-animation sequence 704a and a second target-character-animation sequence 704b based on a target-skeletal-animation sequence 702. Both the first target-character-animation sequence 704a and the second target-character-animation sequence 704b comprise target drawings that correspond to target-skeletal poses of the target-character-animation sequence 702. While the target-character-animation sequence 702 represents a new target motion in both cases, the stylized-puppet-animation system can generate the first target-character-animation sequence 704a and the second target-character-animation sequence 704b comprising target drawings that preserve different visual textures and different stylized motions for different styles.

Consistent with the disclosure above, the stylized-puppet-animation system uses style-aware puppets patterned after an animation character from a first source-character-animation sequence to generate the animation character in the first target-character-animation sequence 704a. Similarly, the stylized-puppet-animation system uses style-aware puppets patterned after an animation character from a second source-character-animation sequence to generate the animation character in the second target-character-animation sequence 704b. While the visual textures and stylized motions differ in the first source-character-animation sequence and the second source-character-animation sequence, the stylized-puppet-animation system accurately transfers both such visual textures and stylized motions to a new target motion by generating the first target-character-animation sequence 704a and the second target-character-animation sequence 704b.

To assess the effectiveness of the stylized-puppet-animation system, researchers conducted experiments to compare source drawings from source-character-animation sequences drawn by an artist to corresponding target-character-animation sequences generated by the stylized-puppet-animation system. As part of the experiment, the researchers implemented the stylized-puppet-animation system on a computing device executing a combination of C++ and Compute Unified Device Architecture ("CUDA") on a quad-core Central Processing Unit ("CPU") that included a Core i7, 2.7 GHz, and 16 GB RAM. The researchers set N=4 for both source subsequences of skeletal frames and target subsequences of skeletal frames. To regulate the transfer of visual texture, the researchers set a weight of 2 for a segmentation-guidance channel $G_{seg}$ and set a temporal-appearance-guidance channel $G_{app}$ to 1.

As part of the experiments, an artist hand drew source-character-animation sequences corresponding to different source-skeletal-animation sequences selected from the Carnegie Mellon University Graphics Lab Motion Capture Database (hereinafter "CMU Motion Capture Database"). In particular, the artist hand drew source-character-animation sequences corresponding to source-skeletal-animation sequences exhibiting a walking, running, and jumping motion in different artistic media, including watercolor, pencil, and chalk. The researchers further selected target-skeletal-animation sequences from the CMU Motion Capture Database that have a similar type of movement to the source-skeletal-animation sequences, but different detailed characteristics. For example, the researchers selected slower, faster, and sneaky walking motions and target-skeletal-animation sequences combining running and jumping motions. The researchers further tested slow motion versions of the selected source-skeletal-animation sequences to demonstrate that the stylized-puppet-animation system can be used for inbetweening.

During the experiments, the stylized-puppet-animation system registered a layered-template puppet to generate style-aware puppets in an average of 15 seconds per frame of a source-character-animation sequence. In some cases, the registration time comprised 6 seconds for registration of a coarse-deformation model and 9 seconds for registration of a residual-deformation model. The stylized-puppet-animation system further generated new target-character-animation sequences in roughly 9 seconds per frame. For example, in some cases, in 1 second per frame, the stylized-puppet-animation system applied a modified-coarse-deformation model and a modified-residual-deformation model to a layered-template puppet and then warped the layered-template puppet to conform to a stylized-target-skeletal pose. Conversely, in roughly 8 seconds per frame, the stylized-puppet-animation system further applied the segmentation-guidance channel $G_{seg}$ and the temporal-appearance-guidance channel $G_{app}$ to render smoothed visual texture and generate a target drawing. As for the latter, the stylized-puppet-animation system parallelized a Graphical Processing Unit ("GPU") with a GeForce GTX 750 Ti using CUDA to apply the segmentation-guidance channel $G_{seg}$ and the temporal-appearance-guidance channel $G_{app}$ to render smoothed visual texture. When parallelizing the GPU, the stylized-puppet-animation system could independently generate each target drawing in a character frame of a target-character-animation sequence. In other words, the stylized-puppet-animation system synthesize target drawings in parallel on a cluster.

Both FIGS. 1 and 7 illustrate the results of one such experiment. As indicated by FIGS. 1 and 7, the stylized-puppet-animation system successfully captures important aspects of the visual appearance and stylized motion of source drawings from different source-character-animation sequences. For example, the stylized-puppet-animation system preserves important characteristics exhibited in the source-character-animation sequences, such as color variations in watercolor style, high-frequency texture in chalk renderings, and fine shading in pencil drawings. Even though the target-skeletal-animation sequences included target-skeletal poses that differ significantly from stylized-skeletal poses corresponding to the source-character-animation sequences, the stylized-puppet-animation system successfully transferred the visual appearances to the target drawings for the new target-character-animation sequences. In addition to transferring the visual appearance, the stylized-puppet-animation system also successfully transferred the stylized motion from source drawings to target drawings for the new target-character-animation sequences, such as by transferring exaggerated arm swings and exaggerated knee raises in walking motions and secondary effects (e.g., squashing and stretching of an animation character's appendages in a jumping or walking motion).

Figure 8:
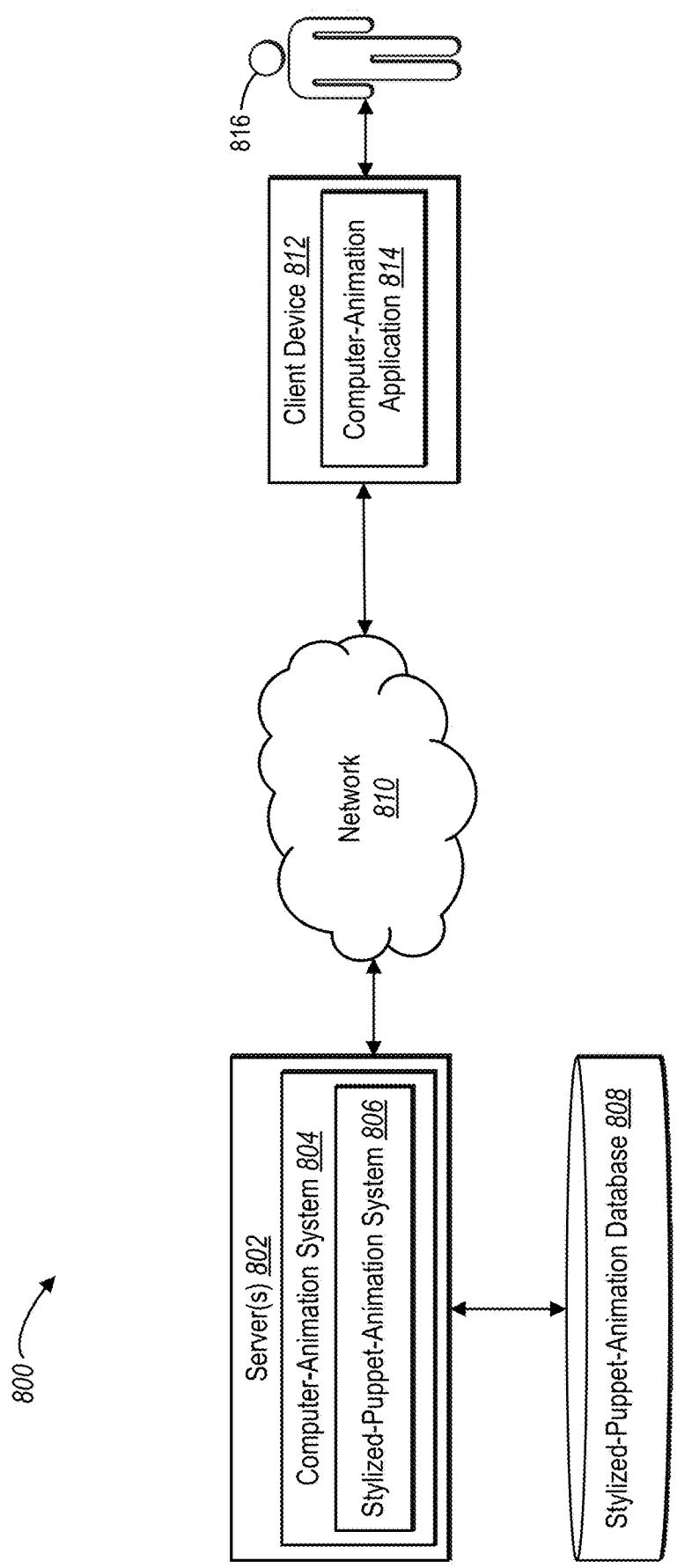
FIG. 8 illustrates a block diagram of an environment in which a stylized-puppet-animation system can operate in accordance with one or more embodiments.
Figure 9:
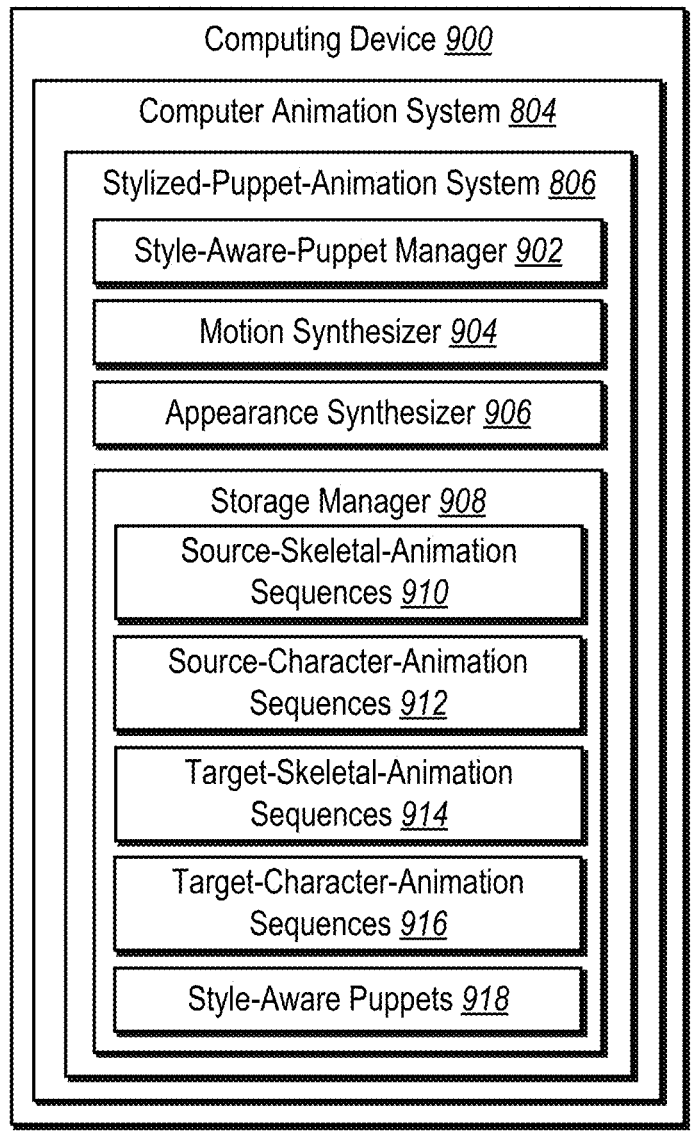
FIG. 9 illustrates a schematic diagram of the stylized-puppet-animation system of FIG. 8 in accordance with one or more embodiments.

Turning now to FIGS. 8 and 9, these figures provide an overview of an environment in which a stylized-puppet-animation system can operate and an example of an architecture for the stylized-puppet-animation system. FIG. 8 is a block diagram illustrating an environment 800 in which the stylized-puppet-animation system 806 (i.e., an embodiment the stylized-puppet-animation system discussed above) can operate in accordance with one or more embodiments. As illustrated in FIG. 8, the environment 800 includes server(s) 802; a client device 812; a user 816; and a network 810, such as the Internet. The server(s) 802 can host a computer-animation system 804 that includes the stylized-puppet-animation system 806. In general, the computer-animation system 804 facilitates the creation, modification, sharing, accessing, storing, and/or deletion of computer generated drawings (e.g., drawings for animation characters). As shown in FIG. 8, the computer-animation system 804 can also include the stylized-puppet-animation system 806.

Although FIG. 8 illustrates an arrangement of the server(s) 802, the client device 812, and the network 810, various additional arrangements are possible. For example, the client device 812 may directly communicate with the server(s) 802 and thereby bypass the network 810. Alternatively, in certain embodiments, the client device 812 includes all (or a portion) of the stylized-puppet-animation system 806. Indeed, the client device 812 may include the stylized-puppet-animation system 806 and perform all of the functions, methods, and processes of the stylized-puppet-animation system described above. For explanatory purposes only, the following paragraphs describe the server(s) 802 as including the stylized-puppet-animation system 806.

As further illustrated in FIG. 8, the client device 812 communicates through the network 810 with the stylized-puppet-animation system 806 via the server(s) 802. Accordingly, the user 816 can access one or more source drawings, source-character-animation sequences, source-skeletal poses, source-skeletal-animation sequences, target-skeletal poses, target-skeletal-animation sequences, or software applications provided (in whole or in part) by the stylized-puppet-animation system 806, including to download a computer-animation application 814. Additionally, in some embodiments, third party server(s) (not shown) provide data to the server(s) 802 that enable the stylized-puppet-animation system 806 to access, download, or upload digital images, motion sequences, skeleton files via the server(s) 802.

As also shown in FIG. 8, in some embodiments, the stylized-puppet-animation system 806 accesses, manages, analyzes, and queries data corresponding to source drawings, source-character-animation sequences, source-skeletal poses, source-skeletal-animation sequences, target-skeletal poses, target drawings, or target-skeletal-animation sequences, such as when identifying a source-character-animation sequence and a source-skeletal-animation sequence corresponding to the source-character-animation sequence. For example, the stylized-puppet-animation system 806 accesses and analyzes source drawings of a source-character-animation sequence that are stored within a stylized-puppet-animation database 808. In some such embodiments, upon analyzing the source drawings, the stylized-puppet-animation system 806 generates style-aware puppets for the source drawings.

To access the functionalities of the stylized-puppet-animation system 806, in certain embodiments, the user 816 interacts with the computer-animation application 814 on the client device 812. In some embodiments, the computer-animation application 814 comprises a web browser, applet, or other software application (e.g., native application) available to the client device 812. Additionally, in some instances, the computer-animation application 814 is integrated within an application or webpage. While FIG. 8 illustrates one client device and one user, in alternative embodiments, the environment 800 includes more than the client device 812 and the user 816. For example, in other embodiments, the environment 800 includes hundreds, thousands, millions, or billions of users and corresponding client devices.

In one or more embodiments, the client device 812 transmits data corresponding to source drawings, source-character-animation sequences, source-skeletal poses, source-skeletal-animation sequences, target-skeletal poses, target drawings, or target-skeletal-animation sequences through the network 810 to the stylized-puppet-animation system 806. For instance, the client device 812 can download source-skeletal-animation sequences, source-character-animation sequences, or target-character-animation sequences; download software applications; or upload source drawings, source-character-animation sequences, source-skeletal-animation sequences, or target-skeletal-animation sequences. To generate the transmitted data or initiate communications, the user 816 interacts with the client device 812. The client device 812 may include, but is not limited to, mobile devices (e.g., smartphones, tablets), laptops, desktops, or any other type of computing device, such as those described below in relation to FIG. 11. Similarly, the network 810 may comprise any of the networks described below in relation to FIG. 11.

For example, in some embodiments, the server(s) 802 receives from the client device 812 (or identifies) a source-character-animation sequence of an animation character portrayed in source drawings. The server(s) 802 also identify (e.g., receive an indication from the client device 812 identifying) a source-skeletal-animation sequence of a source skeleton in source-skeletal poses that corresponds to the source-character-animation sequence. The server(s) 802 subsequently generate style-aware puppets for the source drawings, where each style-aware puppet comprises a character-deformation model, a skeletal-difference map, and a visual-texture representation of a source drawing from the source drawings. The server(s) 802 can also generate a target-character-animation sequence based on the style-aware puppets.

In particular, the server(s) 802 identify a target-skeletal-animation sequence comprising a target skeleton in target-skeletal poses (e.g., by receiving an indication from the client device 812 of the target-skeletal-animation sequence). For a target-skeletal pose, the server(s) compare the target-skeletal pose with the source-skeletal-animation sequence to select a set of source-skeletal poses. The server(s) further select (from within the source-character-animation sequence) a set of source drawings analogous to the set of source-skeletal poses. The server(s) subsequently blend style-aware puppets corresponding to the set of source drawings to create a target-style-aware puppet that corresponds to the target-skeletal pose. Based on the target-style-aware puppet and other generated target-style-aware puppets, the server(s) generate a target-character-animation sequence of the animation character portrayed in target drawings. The server(s) 802 can also provide the target-character-animation sequence for display to the client device 812.

As also illustrated in FIG. 8, the computer-animation system 804 is communicatively coupled to a stylized-puppet-animation database 808. In one or more embodiments, the computer-animation system 804 accesses and queries data from the stylized-puppet-animation database 808 associated with requests from the stylized-puppet-animation system 806. For instance, the computer-animation system 804 may access source drawings, source-character-animation sequences, source-skeletal poses, source-skeletal-animation sequences, target-skeletal poses, target drawings, or target-skeletal-animation sequences for the stylized-puppet-animation system 806. As shown in FIG. 8, the stylized-puppet-animation database 808 is separately maintained from the server(s) 802. Alternatively, in one or more embodiments, the computer-animation system 804 and the stylized-puppet-animation database 808 comprise a single combined system or subsystem within the server(s) 802.

Turning now to FIG. 9, this figure provides additional detail regarding components and features of the stylized-puppet-animation system 806. In particular, FIG. 9 illustrates a computing device 900 implementing the computer-animation system 804 and the stylized-puppet-animation system 806. In some embodiments, the computing device 900 comprises one or more servers (e.g., the server(s) 802). In other embodiments, the computing device 900 comprises one or more client devices (e.g., the client device 812).

As shown in FIG. 9, the computing device 900 includes the computer-animation system 804. In some embodiments, the computer-animation system 804 uses its components to render target drawings of a target-character-animation sequence. Additionally, in some cases, the computer-animation system 804 facilitates the creation, modification, sharing, accessing, storing, and/or deletion of computer generated drawings (e.g., drawings for animation characters).

As further shown in FIG. 9, the computing device 900 includes the stylized-puppet-animation system 806. The stylized-puppet-animation system 806 includes, but is not limited to, a style-aware-puppet manager 902, a motion synthesizer 904, an appearance synthesizer 906, and a storage manager 908. The following paragraphs describe each of these components in turn.

The style-aware-puppet manager 902 accesses and analyzes source-character-animation sequences and source-skeletal-animation sequences and generates style-aware puppets for source drawings. For example, in some embodiments, the style-aware-puppet manager 902 creates layered-template puppets and registers a layered-template puppet to each source drawing within a source-character-animation sequence. Consistent with the disclosure above, in certain implementations, the style-aware-puppet manager 902 generates style-aware puppets that each comprise a character-deformation model, a skeletal-difference map, and a visual-texture representation of a source drawing.

As further shown in FIG. 9, the motion synthesizer 904 uses style-aware puppets to transfer a stylized motion from an animation character of a source-character-animation sequence to a target-skeletal-animation sequence. For instance, in some embodiments, the motion synthesizer 904 selects a set of source drawings analogous to a target-skeletal pose and additional sets of source drawings that overlap the set of source drawings in the source-character-animation sequence. The motion synthesizer 904 further blends style-aware puppets corresponding to the set of source drawings and the additional sets of source drawings to generate a target-style-aware puppet. By blending style-aware puppets corresponding to different (overlapping) sets of source drawings, in some embodiments, the motion synthesizer 904 generates a target-style-aware puppet for each corresponding target drawing in a target-character-animation sequence. Further, in certain implementations, the motion synthesizer 904 applies modified-skeletal-difference maps to a target skeleton in target-skeletal poses.

As further shown in FIG. 9, the appearance synthesizer 906 uses style-aware puppets to transfer a visual appearance of an animation character from a source-character-animation sequence to a target-character-animation sequence. For example, in some embodiments, the appearance synthesizer 906 generates a target-puppet configuration based on a modified-character-deformation model and a stylized-target-skeletal pose. Further, in certain implementations, the appearance synthesizer 906 applies visual texture from a modified-visual-texture representation to a layered-template puppet to generate a target drawing based on one or more guidance channels. Consistent with the disclosure above, in some cases, the appearance synthesizer 906 generates a target-character-animation sequence of the animation character portrayed in target drawings.

As also shown in FIG. 9, the stylized-puppet-animation system 806 includes the storage manager 908. In certain embodiments, the storage manager 908 includes non-transitory computer readable media. Among other things, the storage manager 908 maintains source-skeletal-animation sequences 910, source-character-animation sequences 912, target-skeletal-animation sequences 914, target-character-animation sequences 916, and/or style-aware puppets 918. In certain cases, the style-aware puppets 918 comprises layered-template puppets, style-aware puppets corresponding to source drawings of the source-character-animation sequences 912, and/or target-style-aware puppets corresponding to target-skeletal poses of the target-skeletal-animation sequences 914.

In some implementations, the style-aware-puppet manager 902, the motion synthesizer 904, and/or the appearance synthesizer 906 communicate with the storage manager 908 to access such data files. For example, the style-aware-puppet manager 902 can access the source-skeletal-animation sequences 910 and the source-character-animation sequences 912 maintained by the storage manager 908. Relatedly, in certain embodiments, the motion synthesizer 904 accesses some of the style-aware puppets 918 generated by the style-aware-puppet manager 902 and maintained by the storage manager 908. Additionally, in some cases, the appearance synthesizer 906 accesses target-style-aware puppets from the style-aware puppets 918 maintained by the storage manager 908.

Each of the components 902-916 of the stylized-puppet-animation system 806 can include software, hardware, or both. For example, the components 902-916 can include one or more instructions stored on a computer-readable storage medium and executable by processors of one or more computing devices, such as a client device or server device. When executed by the one or more processors, the computer-executable instructions of the stylized-puppet-animation system 806 can cause the computing device(s) to perform the methods described herein. Alternatively, the components 902-916 can include hardware, such as a special-purpose processing device to perform a certain function or group of functions. Alternatively, the components 902-916 of the stylized-puppet-animation system 806 can include a combination of computer-executable instructions and hardware.

Furthermore, the components 902-916 of the stylized-puppet-animation system 806 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 902-916 may be implemented as a stand-alone application, such as a desktop or mobile application. Furthermore, the components 902-916 may be implemented as one or more web-based applications hosted on a remote server. The components 902-916 may also be implemented in a suite of mobile device applications or "apps." To illustrate, the components 902-916 may be implemented in a software application, including, but not limited to, ADOBE® CREATIVE CLOUD®, ADOBE® ANIMATE, ADOBE® CHARACTER ANIMATER®, ADOBE® AFTER EFFECTS®, ADOBE® PHOTOSHOP®, or ADOBE® LIGHTROOM®. "ADOBE," "CREATIVE CLOUD," "ANIMATE," "CHARACTER ANIMATER," "AFTER EFFECTS," "PHOTO SHOP," and "LIGHTROOM" are either registered trademarks or trademarks of Adobe Systems Incorporated in the United States and/or other countries.

Figure 10:
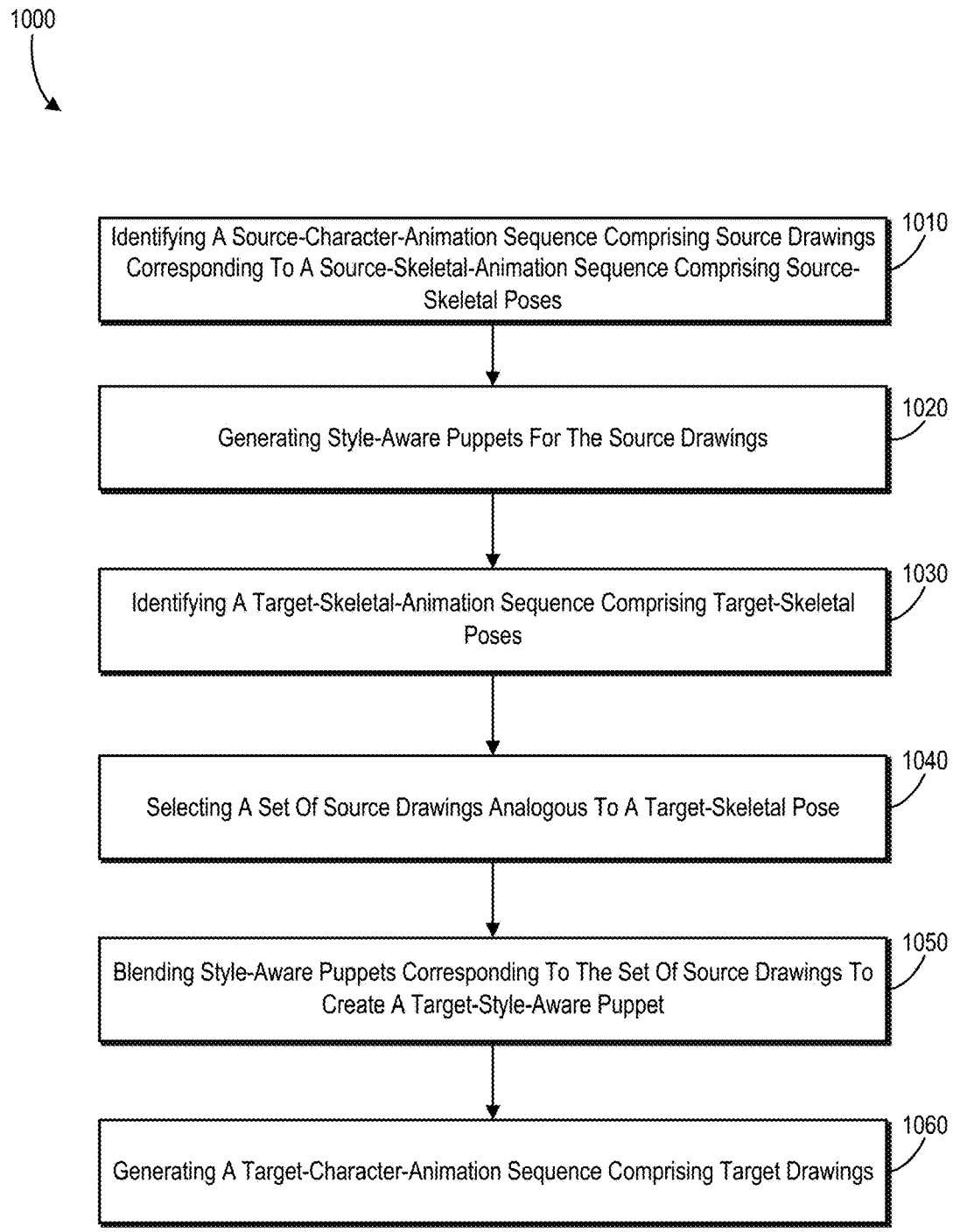
FIG. 10 illustrates a flowchart of a series of acts for using style-aware puppets patterned after a source-character-animation sequence to generate a target-character-animation sequence in accordance with one or more embodiments.

Turning now to FIG. 10, this figure illustrates a flowchart of a series of acts 1000 of using style-aware puppets patterned after a source-character-animation sequence to generate a target-character-animation sequence in accordance with one or more embodiments. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer readable storage medium can comprise instructions that, when executed by one or more processors, cause a computing device to perform the acts depicted in FIG. 10. In still further embodiments, a system can perform the acts of FIG. 10.

As shown in FIG. 10, the acts 1000 include an act 1010 of identifying a source-character-animation sequence comprising source drawings corresponding to a source-skeletal-animation sequence comprising source-skeletal poses. For example, in some embodiments, the act 1010 includes identifying a source-character-animation sequence of an animation character portrayed in source drawings corresponding to a source-skeletal-animation sequence of a source skeleton in source-skeletal poses.

As further shown in FIG. 10, the acts 1000 include an act 1020 of generating style-aware puppets for the source drawings. For example, in certain embodiments, the act 1020 includes generating style-aware puppets for the source drawings, each style-aware puppet comprising a character-deformation model, a skeletal-difference map, and a visual-texture representation of a source drawing from the source-character-animation sequence.

As suggested above, in certain implementations, the character-deformation model comprises a coarse-deformation model of the source drawing and a residual-deformation model of the source drawing; and the skeletal-difference map comprises differences between a source-skeletal pose and a stylized-skeletal pose corresponding to the source drawing. Further, in some embodiments, the style-aware puppets correspond to a layered-template puppet comprising: semantic layers corresponding to segments of the animation character in a model-source drawing; junctions at which each of the semantic layers connect to one or more of the semantic layers; and joints of the skeleton corresponding locations of the semantic layers.

As further shown in FIG. 10, the acts 1000 include an act 1030 of identifying a target-skeletal-animation sequence comprising target-skeletal poses. For example, in certain implementations, the act 1030 includes identifying a target-skeletal-animation sequence comprising a target skeleton in target-skeletal poses.

As further shown in FIG. 10, the acts 1000 include an act 1040 of selecting a set of source drawings analogous to a target-skeletal pose. For example, in some embodiments, the act 1040 includes, for a target-skeletal pose of the target-skeletal poses, selecting from the source-character-animation sequence a set of source drawings analogous to the target-skeletal pose.

As suggested above, in certain implementations, selecting the set of source drawings analogous to the target-skeletal pose comprises: identifying a set of target-skeletal poses adjacent to the target-skeletal pose in the target-skeletal-animation sequence comprising the target skeleton in the target-skeletal poses; selecting a set of source-skeletal poses analogous to the set of target-skeletal poses by comparing trajectories of joints across the set of target-skeletal poses with trajectories of joints across the set of source-skeletal poses; and selecting the set of source drawings by identifying source drawings corresponding to the set of source-skeletal poses in the source-character-animation sequence.

As further shown in FIG. 10, the acts 1000 include an act 1050 of blending style-aware puppets corresponding to the set of source drawings to create a target-style-aware puppet. For example, in some embodiments, the act 1050 includes blending style-aware puppets corresponding to the set of source drawings to create a target-style-aware puppet corresponding to the target-skeletal pose.

As suggested above, in certain implementations, blending the style-aware puppets corresponding to the set of source drawings comprises: interpolating coarse-deformation models for the style-aware puppets corresponding to the set of source drawings to create a modified-coarse-deformation model for the target-style-aware puppet; linearly blending residual-deformation models for the style-aware puppets corresponding to the set of source drawings to create a modified-residual-deformation model for the target-style-aware puppet; linearly blending skeletal-difference maps for the style-aware puppets to create a modified-skeletal-difference map for the target-style-aware puppet; and linearly blending visual-texture representations for the style-aware puppets corresponding to the set of source drawings to create a modified-visual-texture representation for the target-style-aware puppet.

Additionally, in certain implementations, linearly blending the visual-texture representations for the style-aware puppets corresponding to the set of source drawings comprises: rectifying the visual-texture representations for each style-aware puppet corresponding to the set of source drawings based on the coarse-deformation model for the style-aware puppet and the residual-deformation model for the style-aware puppet; and linearly blending the rectified visual-texture representations to create the modified-visual-texture representation for the target-style-aware puppet.

As further shown in FIG. 10, the acts 1000 include an act 1060 of generating a target-character-animation sequence comprising target drawings. For example, in some embodiments, the act 1050 includes, based on the target-style-aware puppet, generating a target-character-animation sequence of the animation character portrayed in target drawings.

In addition to the acts 1010-1060, in some embodiments, the acts 1000 further include generating a layered-template puppet for the style-aware puppets by: identifying a model-source drawing of the animation character; creating semantic layers corresponding to segments of the animation character in the model-source drawing; identifying junctions at which each of the semantic layers connect to one or more of the semantic layers; and assigning joints of the source skeleton to corresponding locations of the semantic layers.

As indicated above, in some cases, the acts 1000 further include determining the coarse-deformation model of the source drawing by: generating a layered mesh for the layered-template puppet, wherein the layered mesh comprises mesh layers corresponding to the semantic layers of the layered-template puppet; and adjusting the mesh layers of the layered mesh to conform to the semantic layers of the layered-template puppet positioned according to the source drawing.

Similarly, in some embodiments, the acts 1000 further include determining the coarse-deformation model of the source drawing by: generating a layered as-rigid-as-possible ("ARAP") mesh for the layered-template puppet, wherein the layered ARAP mesh comprises ARAP mesh layers corresponding to the semantic layers of the layered-template puppet; and adjusting the ARAP mesh layers of the layered ARAP mesh to conform to the semantic layers of the layered-template puppet positioned according to the source drawing.

Relatedly, in certain embodiments, the acts 1000 further include determining the skeletal-difference map by: determining joint positions of the layered-template puppet positioned according to the source drawing based on attachment points of the mesh layers on the semantic layers of the layered-template puppet; inferring a root-joint position, bone lengths, and joint rotations based on the joint positions of the layered-template puppet to create the stylized-skeletal pose corresponding to the source drawing; and determining differences between root-joint positions, bone lengths, and joint rotations of the source-skeletal pose and the stylized-skeletal pose.

Additionally, in certain implementations, the acts 1000 further include blending the style-aware puppets corresponding to the set of source drawings to create the target-style-aware puppet by: identifying a second set of source drawings from the source-character-animation sequence, the second set of source drawings overlapping with the set of source drawings in the source-character-animation sequence; and blending style-aware puppets corresponding to the second set of source drawings with the style-aware puppets corresponding to the set of source drawings.

Similarly, in some cases, the acts 1000 further include blending the style-aware puppets corresponding to the set of source drawings to create the target-style-aware puppet by: identifying additional sets of source drawings from the source-character-animation sequence, the additional sets of source drawings each comprising at least one source drawing overlapping with the set of source drawings in the source-character-animation sequence; and blending style-aware puppets corresponding to the additional sets of source drawings with the style-aware puppets corresponding to the set of source drawings.

Relatedly, in certain implementations, the acts 1000 further include blending the style-aware puppets corresponding to the additional sets of source drawings with the style-aware puppets corresponding to the set of source drawings by: interpolating ARAP meshes for the style-aware puppets corresponding to both the set of source drawings and the additional sets of source drawings to create a modified ARAP mesh for the target-style-aware puppet; linearly blending residual-deformation models for the style-aware puppets corresponding to both the set of source drawings and the additional sets of source drawings to create a modified-residual-deformation model for the target-style-aware puppet; linearly blending skeletal-difference maps for the style-aware puppets corresponding to both the set of source drawings and the additional sets of source drawings to create a modified-skeletal-difference map for the target-style-aware puppet; and linearly blending visual-texture representations for the style-aware puppets corresponding to both the set of source drawings and the additional sets of source drawings to create a modified-visual-texture representation for the target-style-aware puppet.

As noted above, the stylized-puppet-animation system generates stylized-target-skeletal poses and target drawings. Accordingly, in some embodiments, the acts 1000 further include, based on the target-style-aware puppet, generating the target-character-animation sequence of the animation character portrayed in the target drawings by, for the target-style-aware puppet: applying the modified-skeletal-difference map to the target-skeletal pose to generate a stylized-target-skeletal pose; and utilizing the modified-coarse-deformation model for the target-style-aware puppet, the modified-residual-deformation model for the target-style-aware puppet, and the stylized-target-skeletal pose to generate the target drawing.

Furthermore, in certain implementations, the acts 1000 further include, based on the target-style-aware puppet, generating the target-character-animation sequence of the animation character portrayed in the target drawings by, for the target-style-aware puppet, utilizing a segmentation-guidance channel and a temporal-appearance-guidance channel with the modified-visual-texture representation to generate the animation character in the target drawing. Similarly, in some embodiments, the acts 1000 further include, based on the target-style-aware puppet, generating the target-character-animation sequence of the animation character portrayed in the target drawings by, for the target-style-aware puppet, generating a segmentation-guidance channel comprising segment-color labels for semantic layers corresponding to a style-aware puppet of a source drawing and segment-color labels for semantic layers corresponding to the target-style-aware puppet; generating a temporal-appearance-guidance channel comprising a smoothed visual-texture representation corresponding to a style-aware puppet of a source drawing and a smoothed modified-visual-texture representation for the target-style-aware puppet; and synthesizing a target drawing for the target-character-animation sequence based on the segmentation-guidance channel and the temporal-appearance-guidance channel.

In addition (or in the alternative) to the acts describe above, in some embodiments, the acts 1000 include a step for generating a target-character-animation sequence of the animation character corresponding to the target-skeletal-animation sequence utilizing the style-aware puppets. For instance, the algorithms and acts described in reference to FIGS. 4 and 6 can comprise the corresponding acts for a step for generating a target-character-animation sequence of the animation character corresponding to the target-skeletal-animation sequence utilizing the style-aware puppets.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

Figure 11:
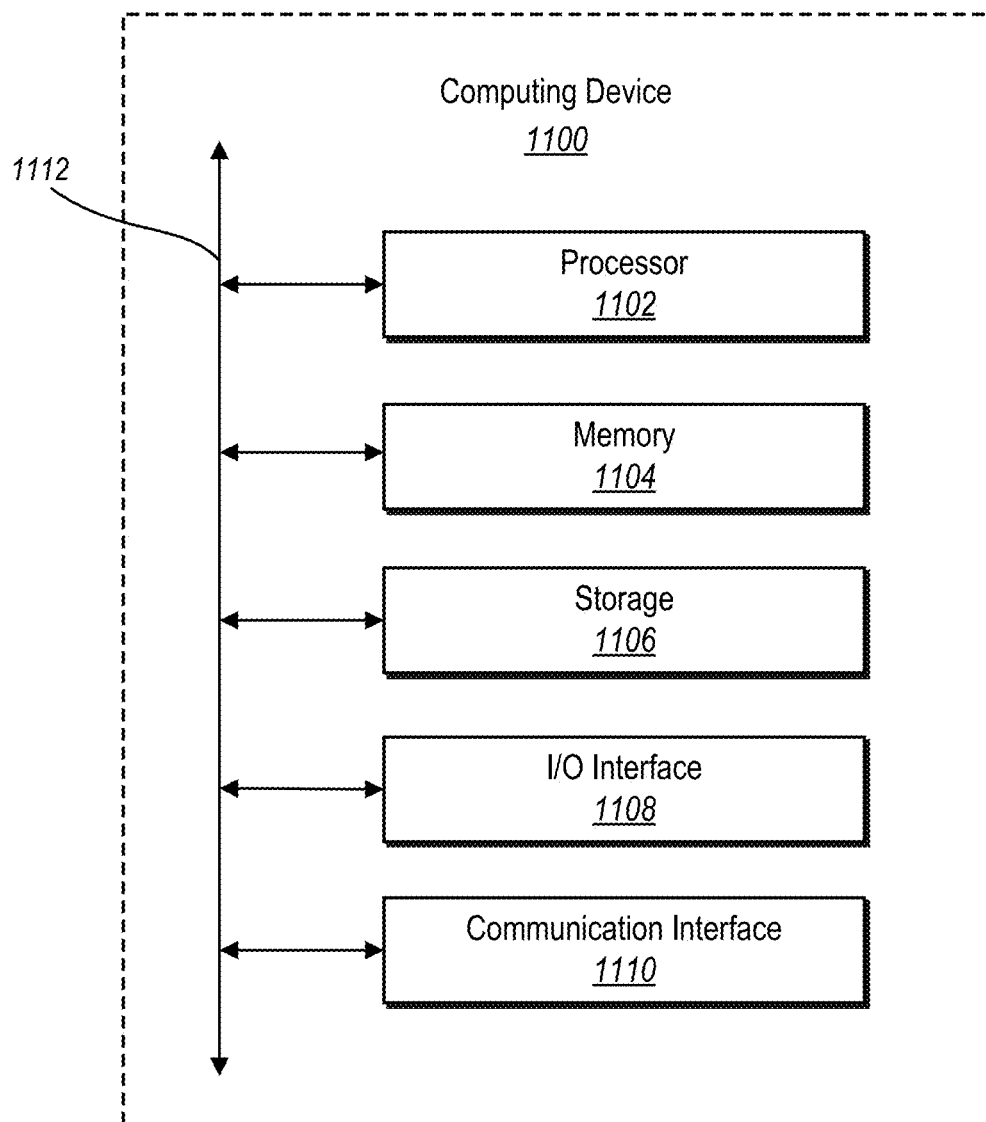
FIG. 11 illustrates a block diagram of an exemplary computing device for implementing one or more embodiments of the present disclosure.

FIG. 11 illustrates a block diagram of exemplary computing device 1100 that may be configured to perform one or more of the processes described above. As shown by FIG. 11, the computing device 1100 can comprise a processor 1102, a memory 1104, a storage device 1106, an I/O interface 1108, and a communication interface 1110, which may be communicatively coupled by way of a communication infrastructure 1112. In certain embodiments, the computing device 1100 can include fewer or more components than those shown in FIG. 11. Components of the computing device 1100 shown in FIG. 11 will now be described in additional detail.

In one or more embodiments, the processor 1102 includes hardware for executing instructions, such as those making up a computer program. As an example, and not by way of limitation, to execute instructions for digitizing real-world objects, the processor 1102 may retrieve (or fetch) the instructions from an internal register, an internal cache, the memory 1104, or the storage device 1106 and decode and execute them. The memory 1104 may be a volatile or non-volatile memory used for storing data, metadata, and programs for execution by the processor(s). The storage device 1106 includes storage, such as a hard disk, flash disk drive, or other digital storage device, for storing data or instructions related to object digitizing processes (e.g., digital scans, digital models).

The I/O interface 1108 allows a user to provide input to, receive output from, and otherwise transfer data to and receive data from computing device 1100. The I/O interface 1108 may include a mouse, a keypad or a keyboard, a touch screen, a camera, an optical scanner, network interface, modem, other known I/O devices or a combination of such I/O interfaces. The I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1108 is configured to provide graphical data to a display for presentation to a user. The graphical data may be representative of one or more graphical user interfaces and/or any other graphical content as may serve a particular implementation.

The communication interface 1110 can include hardware, software, or both. In any event, the communication interface 1110 can provide one or more interfaces for communication (such as, for example, packet-based communication) between the computing device 1100 and one or more other computing devices or networks. As an example and not by way of limitation, the communication interface 1110 may include a network interface controller ("NIC") or network adapter for communicating with an Ethernet or other wire-based network or a wireless NIC ("WNIC") or wireless adapter for communicating with a wireless network, such as a WI-FI.

Additionally, the communication interface 1110 may facilitate communications with various types of wired or wireless networks. The communication interface 1110 may also facilitate communications using various communication protocols. The communication infrastructure 1112 may also include hardware, software, or both that couples components of the computing device 1100 to each other. For example, the communication interface 1110 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

We claim:

1. A system comprising:
   at least one processor; and
   at least one non-transitory computer memory comprising a source-character-animation sequence of a two-dimensional animation character portrayed in source drawings corresponding to a source-skeletal-animation sequence of a source skeleton in source-skeletal poses, and instructions that, when executed by at least one processor, cause the system to:
   generate style-aware puppets for the source drawings portraying the two-dimensional animation character, each style-aware puppet comprising a coarse-deformation model of a source drawing portraying the two-dimensional animation character from the source-character-animation sequence, a residual-deformation model of the source drawing portraying the two-dimensional animation character, a skeletal-difference map comprising differences between a source-skeletal pose and a stylized-skeletal pose corresponding to the source drawing portraying the two-dimensional animation character, and a visual-texture representation of the source drawing portraying the two-dimensional animation character;
   identify a target-skeletal-animation sequence comprising a target skeleton in target-skeletal poses;
   generate target-style-aware puppets corresponding to the target-skeletal-animation sequence by, for a target-skeletal pose of the target-skeletal poses:
      comparing the target-skeletal pose with the source-skeletal-animation sequence to select a set of source-skeletal poses;
      identifying a set of source drawings from the source-character-animation sequence from the source-character-animation sequence corresponding to the set of source-skeletal poses;

blending the style-aware puppets corresponding to the set of source drawings to create a target-style-aware puppet; and based on the target-style-aware puppets, generate a target-character-animation sequence of the two-dimensional animation character portrayed in target drawings corresponding to the target-skeletal-animation sequence.

2. The system of claim 1, further comprising instructions that, when executed by the at least one processor, cause the system to:

compare the target-skeletal pose with the source-skeletal-animation sequence to select the set of source-skeletal poses by:

identifying a set of target-skeletal poses adjacent to the target-skeletal pose in the target-skeletal-animation sequence; and selecting the set of source-skeletal poses by comparing trajectories of joints across the set of target-skeletal poses with trajectories of joints across the set of source-skeletal poses; and identify the set of source drawings by identifying source drawings corresponding to the set of source-skeletal poses in the source-character-animation sequence.

3. The system of claim 1, further comprising instructions that, when executed by the at least one processor, cause the system to blend the style-aware puppets corresponding to the set of source drawings by:

interpolating coarse-deformation models for the style-aware puppets corresponding to the set of source drawings to create a modified-coarse-deformation model for the target-style-aware puppet;

linearly blending residual-deformation models for the style-aware puppets corresponding to the set of source drawings to create a modified-residual-deformation model for the target-style-aware puppet;

linearly blending skeletal-difference maps for the style-aware puppets to create a modified-skeletal-difference map for the target-style-aware puppet; and linearly blending visual-texture representations for the style-aware puppets corresponding to the set of source drawings to create a modified-visual-texture representation for the target-style-aware puppet.

4. The system of claim 3, further comprising instructions that, when executed by the at least one processor, cause the system to linearly blend the visual-texture representations for the style-aware puppets corresponding to the set of source drawings by:

rectifying the visual-texture representations for each style-aware puppet corresponding to the set of source drawings based on the coarse-deformation model for the style-aware puppet and the residual-deformation model for the style-aware puppet; and linearly blending the rectified visual-texture representations to create the modified-visual-texture representation for the target-style-aware puppet.

5. The system of claim 4, further comprising instructions that, when executed by the at least one processor, cause the system to, based on the target-style-aware puppet, generate the target-character-animation sequence of the two-dimensional animation character portrayed in the target drawings by, for the target-style-aware puppet:

applying the modified-skeletal-difference map to the target-skeletal pose to generate a stylized-target-skeletal pose; and utilizing the modified-coarse-deformation model for the target-style-aware puppet, the modified-residual-deformation model for the target-style-aware puppet, and the stylized-target-skeletal pose to generate a target drawing portraying the two-dimensional animation character.

6. The system of claim 4, further comprising instructions that, when executed by the at least one processor, cause the system to, based on the target-style-aware puppet, generate the target-character-animation sequence of the two-dimensional animation character portrayed in the target drawings by, for the target-style-aware puppet, utilize a segmentation-guidance channel and a temporal-appearance-guidance channel with the modified-visual-texture representation to generate the two-dimensional animation character in the target drawing.

7. The system of claim 1, further comprising instructions that, when executed by the at least one processor, cause the system to determine the coarse-deformation model of the source drawing portraying the two-dimensional animation character by:

generating a layered as-rigid-as-possible ("ARAP") mesh for a layered-template puppet, wherein the layered ARAP mesh comprises ARAP mesh layers corresponding to semantic layers of the layered-template puppet; and adjusting the ARAP mesh layers of the layered ARAP mesh to conform to the semantic layers of the layered-template puppet positioned according to the source drawing.

8. The system of claim 1, further comprising instructions that, when executed by the at least one processor, cause the system to select the set of source drawings from the source-character-animation sequence by:

identifying a set of target-skeletal poses adjacent to the target-skeletal pose in the target-skeletal-animation sequence comprising the target skeleton in the target-skeletal poses;

selecting a set of source-skeletal poses analogous to the set of target-skeletal poses by comparing trajectories of joints across the set of target-skeletal poses with trajectories of joints across the set of source-skeletal poses; and selecting the set of source drawings by identifying source drawings corresponding to the set of source-skeletal poses in the source-character-animation sequence.

9. The system of claim 8, further comprising instructions that, when executed by the at least one processor, cause the system to blend the style-aware puppets corresponding to the set of source drawings to create the target-style-aware puppet by:

identifying additional sets of source drawings from the source-character-animation sequence, the additional sets of source drawings each comprising at least one source drawing overlapping with the set of source drawings in the source-character-animation sequence; and blending style-aware puppets corresponding to the additional sets of source drawings with the style-aware puppets corresponding to the set of source drawings.

10. The system of claim 9, further comprising instructions that, when executed by the at least one processor, cause the system to blend the style-aware puppets corresponding to the additional sets of source drawings with the style-aware puppets corresponding to the set of source drawings by:

interpolating ARAP meshes for the style-aware puppets corresponding to both the set of source drawings and the additional sets of source drawings to create a modified ARAP mesh for the target-style-aware puppet;

linearly blending residual-deformation models for the style-aware puppets corresponding to both the set of source drawings and the additional sets of source drawings to create a modified-residual-deformation model for the target-style-aware puppet;

linearly blending skeletal-difference maps for the style-aware puppets corresponding to both the set of source drawings and the additional sets of source drawings to create a modified-skeletal-difference map for the target-style-aware puppet; and linearly blending visual-texture representations for the style-aware puppets corresponding to both the set of source drawings and the additional sets of source drawings to create a modified-visual-texture representation for the target-style-aware puppet.

11. A non-transitory computer readable storage medium comprising instructions that, when executed by at least one processor, cause a computing device to:

identify a source-character-animation sequence of a two-dimensional animation character portrayed in source drawings corresponding to a source-skeletal-animation sequence of a source skeleton in source-skeletal poses;

generate style-aware puppets for the source drawings portraying the two-dimensional animation character, each style-aware puppet comprising a coarse-deformation model of a source drawing portraying the two-dimensional animation character from the source drawings, a residual-deformation model of the source drawing, a skeletal-difference map comprising differences between a source-skeletal pose and a stylized-skeletal pose corresponding to the source drawing, and a visual-texture representation of the source drawing;

identify a target-skeletal-animation sequence comprising a target skeleton in target-skeletal poses;

for a target-skeletal pose of the target-skeletal poses, select from the source-character-animation sequence a set of source drawings analogous to the target-skeletal pose; and blend style-aware puppets corresponding to the set of source drawings to create a target-style-aware puppet corresponding to the target-skeletal pose; and based on the target-style-aware puppets, generate a target-character-animation sequence of the two-dimensional animation character portrayed in target drawings.

12. The non-transitory computer readable storage medium of claim 11, further comprising instructions that, when executed by the at least one processor, cause the computing device to blend the style-aware puppets corresponding to the set of source drawings by:

interpolating coarse-deformation models for the style-aware puppets corresponding to the set of source drawings to create a modified-coarse-deformation model for the target-style-aware puppet;

linearly blending residual-deformation models for the style-aware puppets corresponding to the set of source drawings to create a modified-residual-deformation model for the target-style-aware puppet;

linearly blending skeletal-difference maps for the style-aware puppets to create a modified skeletal difference for the target-style-aware puppet; and linearly blending visual-texture representations for the style-aware puppets corresponding to the set of source drawings to create a modified-visual-texture representation for the target-style-aware puppet.

13. The non-transitory computer readable storage medium of claim 12, further comprising instructions that, when executed by the at least one processor, cause the computing device to linearly blend the visual-texture representations for the style-aware puppets corresponding to the set of source drawings by:

rectifying the visual-texture representations for each style-aware puppet corresponding to the set of source drawings based on the coarse-deformation model for the style-aware puppet and the residual-deformation model for the style-aware puppet; and linearly blending the rectified visual-texture representations to create a modified-visual-texture representation for the target-style-aware puppet.

14. The non-transitory computer readable storage medium of claim 11, further comprising instructions that, when executed by the at least one processor, cause the computing device to select the set of source drawings analogous to the target-skeletal pose by:

identifying a set of target-skeletal poses adjacent to the target-skeletal pose in the target-skeletal-animation sequence comprising the target skeleton in the target-skeletal poses;

selecting a set of source-skeletal poses analogous to the set of target-skeletal poses by comparing trajectories of joints across the set of target-skeletal poses with trajectories of joints across the set of source-skeletal poses; and selecting the set of source drawings by identifying source drawings corresponding to the set of source-skeletal poses in the source-character-animation sequence.

15. The non-transitory computer readable storage medium of claim 11, further comprising instructions that, when executed by the at least one processor, cause the computing device to, based on the target-style-aware puppets, generate the target-character-animation sequence of the two-dimensional animation character portrayed in the target drawings by, for the target-style-aware puppet:

generating a segmentation-guidance channel comprising segment-color labels for semantic layers corresponding to a style-aware puppet of a source drawing and segment-color labels for semantic layers corresponding to the target-style-aware puppet;

generating a temporal-appearance-guidance channel comprising a smoothed visual-texture representation corresponding to the style-aware puppet of the source drawing and a smoothed modified-visual-texture representation for the target-style-aware puppet; and synthesizing a target drawing for the target-character-animation sequence based on the segmentation-guidance channel and the temporal-appearance-guidance channel.

16. A method comprising:

identifying a source-character-animation sequence of a two-dimensional animation character portrayed in source drawings corresponding to a source-skeletal-animation sequence of a source skeleton in source-skeletal poses;

generating style-aware puppets for the source drawings portraying the two-dimensional animation character, each style-aware puppet comprising a coarse-deformation model of a source drawing portraying the two-dimensional animation character from the source drawings, a residual-deformation model of the source drawing, a skeletal-difference map comprising differences between a source-skeletal pose and a stylized-skeletal pose corresponding to the source drawing, and a visual-texture representation of the source drawing;

identifying a target-skeletal-animation sequence comprising a target skeleton in target-skeletal poses;

for a target-skeletal pose of the target-skeletal poses, selecting from the source-character-animation sequence a set of source drawings analogous to the target-skeletal pose; and blending style-aware puppets corresponding to the set of source drawings to create a target-style-aware puppet corresponding to the target-skeletal pose; and based on the target-style-aware puppets, generating a target-character-animation sequence of the two-dimensional animation character portrayed in target drawings.

17. The method of claim 16, wherein the style-aware puppets correspond to a layered-template puppet comprising:

semantic layers corresponding to segments of the two-dimensional animation character in a model-source drawing;

junctions at which each of the semantic layers connect to one or more of the semantic layers; and joints of the source skeleton corresponding to locations of the semantic layers.

18. The method of claim 17, further comprising determining the coarse-deformation model of the source drawing by:

generating a layered mesh for the layered-template puppet, wherein the layered mesh comprises mesh layers corresponding to the semantic layers of the layered-template puppet; and adjusting the mesh layers of the layered mesh to conform to the semantic layers of the layered-template puppet positioned according to the source drawing.

19. The method of claim 18, further comprising determining the skeletal-difference map by:

determining joint positions of the layered-template puppet positioned according to the source drawing based on attachment points of the mesh layers on the semantic layers of the layered-template puppet;

inferring a root-joint position, bone lengths, and joint rotations based on the joint positions of the layered-template puppet to create the stylized-skeletal pose corresponding to the source drawing; and determining differences between root-joint positions, bone lengths, and joint rotations of the source-skeletal pose and the stylized-skeletal pose.

20. The method of claim 16, further comprising selecting the set of source drawings analogous to the target-skeletal pose by:

identifying a set of target-skeletal poses adjacent to the target-skeletal pose in the target-skeletal-animation sequence comprising the target skeleton in the target-skeletal poses;

selecting a set of source-skeletal poses analogous to the set of target-skeletal poses by comparing trajectories of joints across the set of target-skeletal poses with trajectories of joints across the set of source-skeletal poses; and selecting the set of source drawings by identifying source drawings corresponding to the set of source-skeletal poses in the source-character-animation sequence.

\* \* \* \* \*